United States Patent
Warner

(10) Patent No.: US 9,834,937 B2
(45) Date of Patent: Dec. 5, 2017

(54) NON-SKID SAFETY MAT FOR PROVIDING ADHERING SUPPORT WHEN PLACED UPON A SLOPING ROOF

(71) Applicant: Steel Grip Samm, Inc.

(72) Inventor: Neil A. Warner, Kewadin, MI (US)

(73) Assignee: Steel Grip Samm, Inc., Kewadin, MI (US)

( * ) Notice: Subject to any disclaimer, the term of this patent is extended or adjusted under 35 U.S.C. 154(b) by 0 days.

(21) Appl. No.: 15/441,765

(22) Filed: Feb. 24, 2017

(65) Prior Publication Data

US 2017/0159295 A1 Jun. 8, 2017

Related U.S. Application Data

(63) Continuation-in-part of application No. 14/531,274, filed on Nov. 3, 2014, now Pat. No. 9,593,497.

(60) Provisional application No. 61/899,321, filed on Nov. 4, 2013.

(51) Int. Cl.

| | |
|---|---|
| *E04D 13/12* | (2006.01) |
| *B29C 45/14* | (2006.01) |
| *B29C 45/37* | (2006.01) |
| *B32B 5/02* | (2006.01) |
| *B32B 25/10* | (2006.01) |
| *B32B 25/14* | (2006.01) |
| *B32B 25/16* | (2006.01) |
| *B32B 3/08* | (2006.01) |
| *E04G 21/32* | (2006.01) |
| *B29L 31/00* | (2006.01) |

(52) U.S. Cl.
CPC ........ *E04D 13/12* (2013.01); *B29C 45/14778* (2013.01); *B29C 45/372* (2013.01); *B32B 3/085* (2013.01); *B32B 5/02* (2013.01); *B32B 25/10* (2013.01); *B32B 25/14* (2013.01); *B32B 25/16* (2013.01); *E04G 21/3214* (2013.01); *B29K 2011/00* (2013.01); *B29K 2995/0008* (2013.01); *B29L 2031/7324* (2013.01); *B32B 2307/208* (2013.01); *B32B 2307/546* (2013.01); *B32B 2307/554* (2013.01); *B32B 2307/5825* (2013.01); *B32B 2307/744* (2013.01); *B32B 2419/06* (2013.01); *B32B 2471/04* (2013.01)

(58) Field of Classification Search
CPC ..... E04G 21/3214; B32B 15/06; B32B 25/16; B32B 37/18
USPC .................... 428/317.1, 99, 308.4
See application file for complete search history.

(56) References Cited

U.S. PATENT DOCUMENTS

| | | | | |
|---|---|---|---|---|
| 3,102,314 A | * | 9/1963 | Alderfer | ................. A41F 1/002 24/303 |
| 3,958,385 A | * | 5/1976 | Bondra, Jr. | ............. E04L 31/74 52/404.1 |

(Continued)

*Primary Examiner* — Paola Agudelo
(74) *Attorney, Agent, or Firm* — Dinsmore & Shohl LLP

(57) ABSTRACT

An anti-skid mat including a skid-resistant material exhibiting flexible properties and having a generally planar configuration with a length, width and thickness. A plurality of hinges or flex lines design into the material and which enable the material to conform to any irregular surface associated with the metal roof. The mat underside can include any or both of magnetic attracting or conformal adhering undersides such that placement of the material upon a sloping magnetic attracting or non-attracting roof securely supports the weight of a user standing on the mat without slippage relative to the roof.

8 Claims, 26 Drawing Sheets

(56) References Cited

U.S. PATENT DOCUMENTS

| | | | | |
|---|---|---|---|---|
| 4,058,335 A | * | 11/1977 | Abe | E05C 19/16 |
| | | | | 248/206.5 |
| 4,663,874 A | * | 5/1987 | Sano | G09F 7/04 |
| | | | | 40/600 |
| 4,671,028 A | * | 6/1987 | Figone | E04C 2/405 |
| | | | | 428/167 |
| 5,503,891 A | * | 4/1996 | Marshall | B32B 27/18 |
| | | | | 40/600 |
| 2003/0138620 A1 | * | 7/2003 | Fonseca | B32B 7/12 |
| | | | | 428/317.1 |
| 2004/0053002 A1 | * | 3/2004 | Kobayashi | A47L 23/266 |
| | | | | 428/95 |
| 2006/0177626 A1 | * | 8/2006 | Johnson | A47G 27/0231 |
| | | | | 428/99 |
| 2010/0028589 A1 | * | 2/2010 | Van Houten | B27J 1/003 |
| | | | | 428/53 |
| 2011/0143615 A1 | * | 6/2011 | Gold | A47G 27/0206 |
| | | | | 442/1 |

* cited by examiner

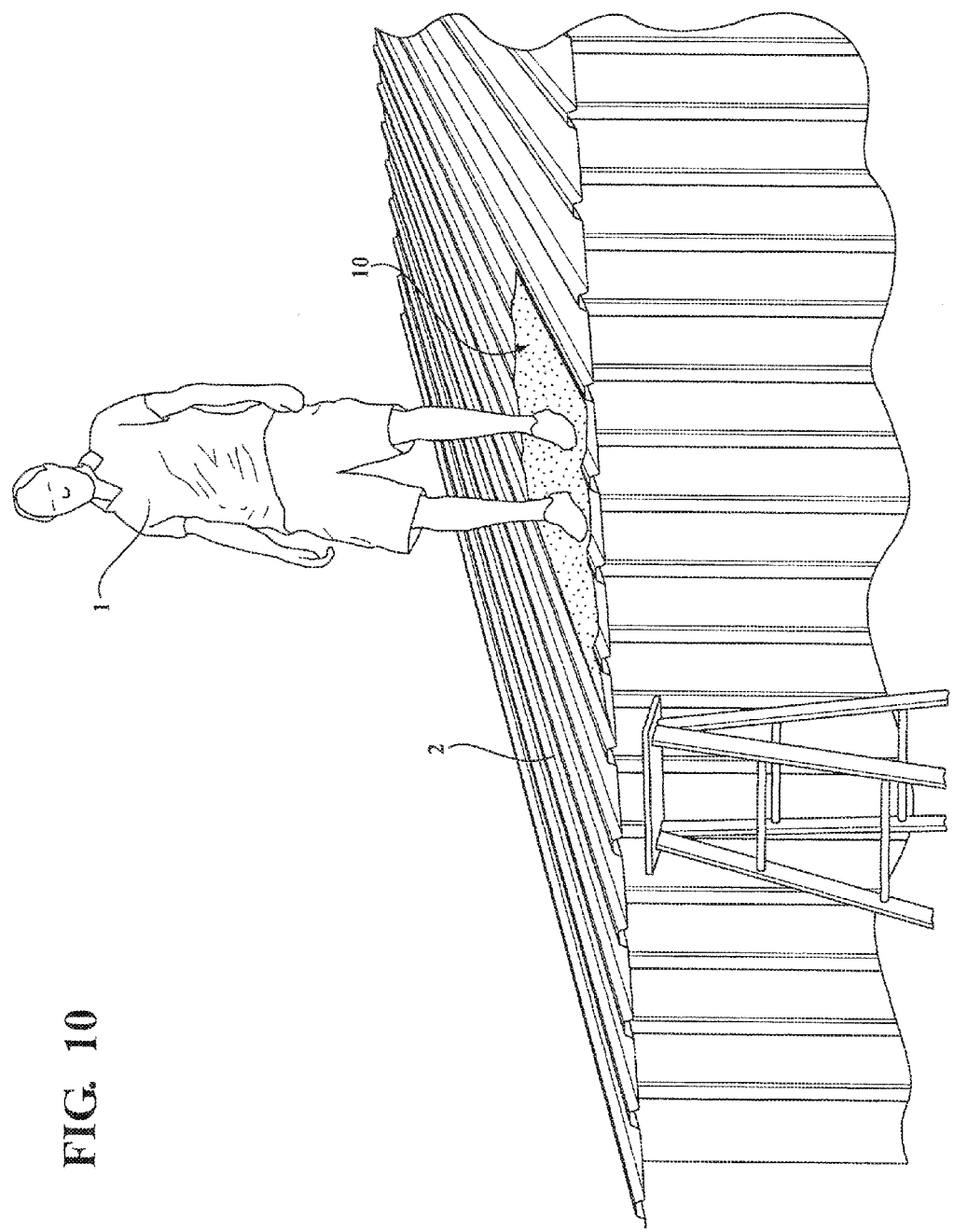

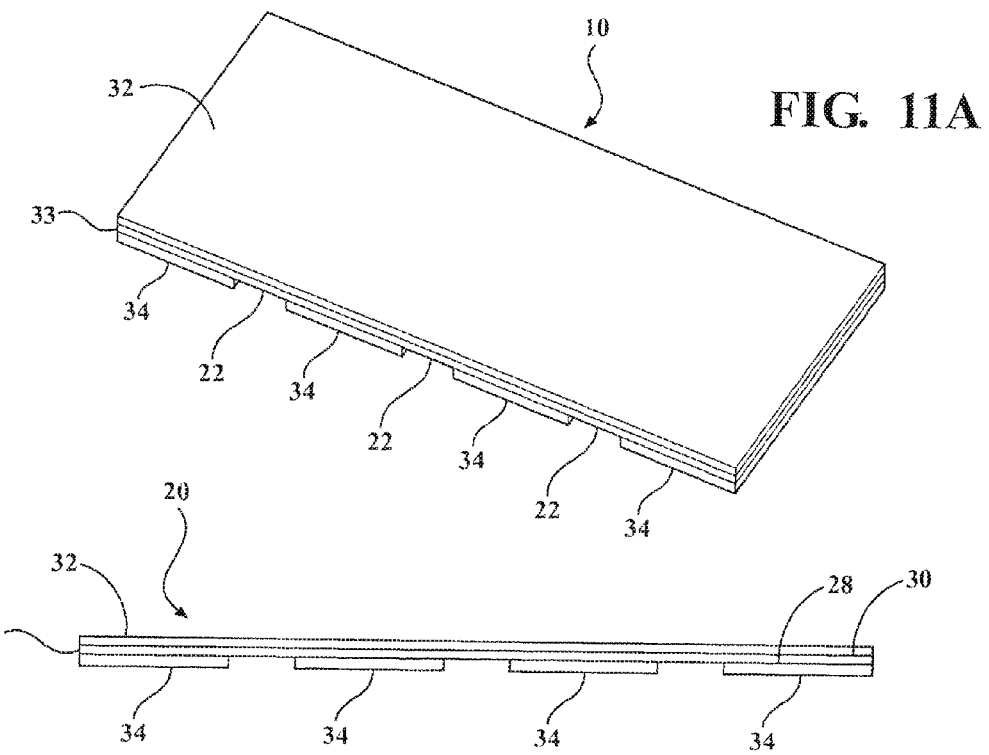
FIG. 11A
FIG. 11B
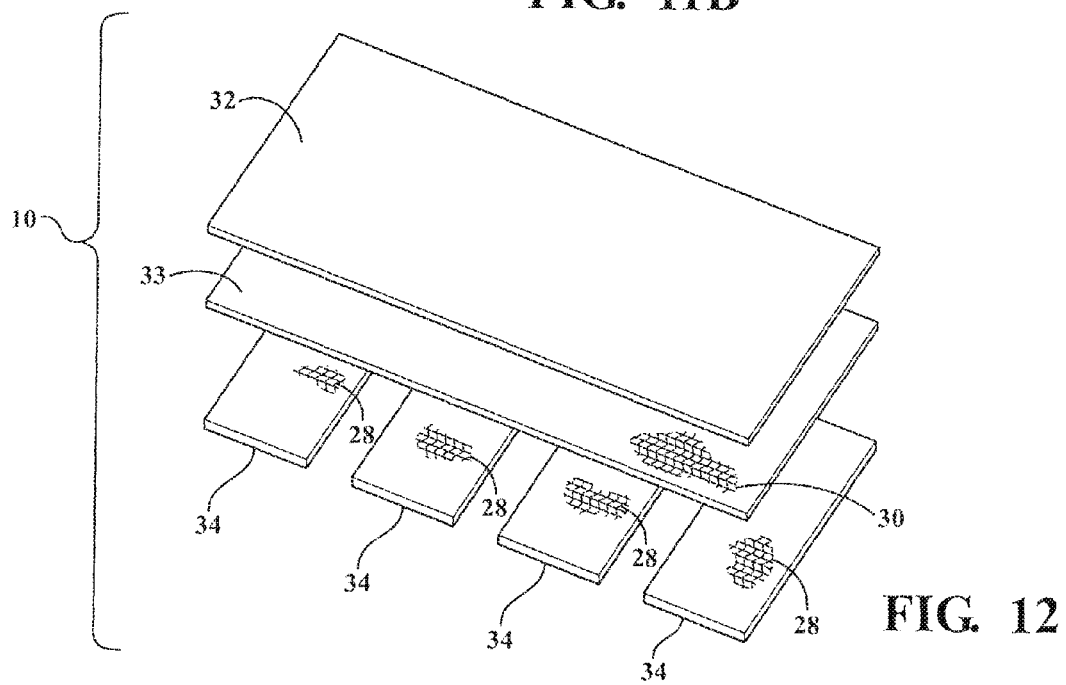
FIG. 12

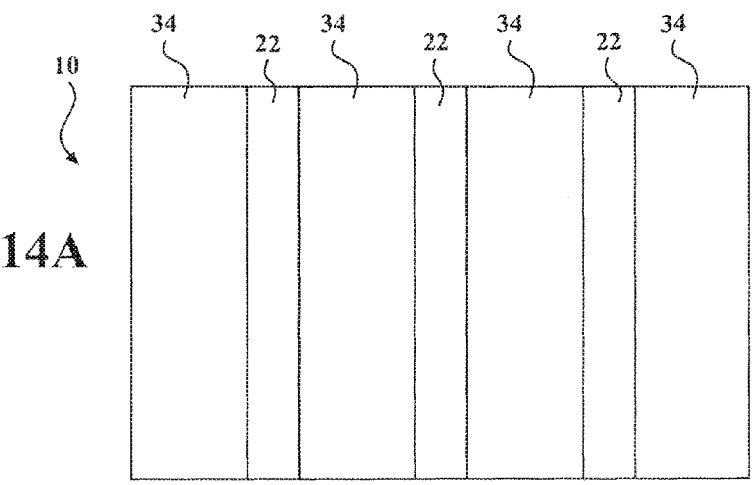
FIG. 14A
FIG. 14B
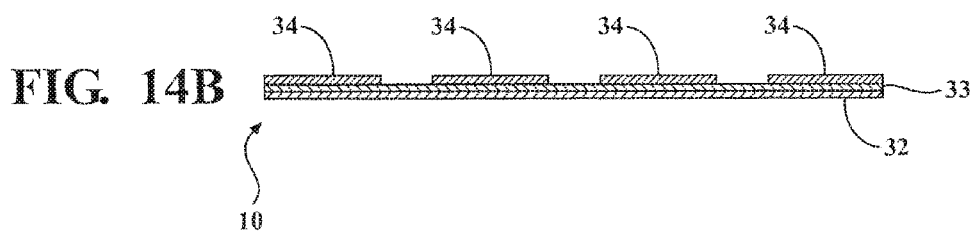
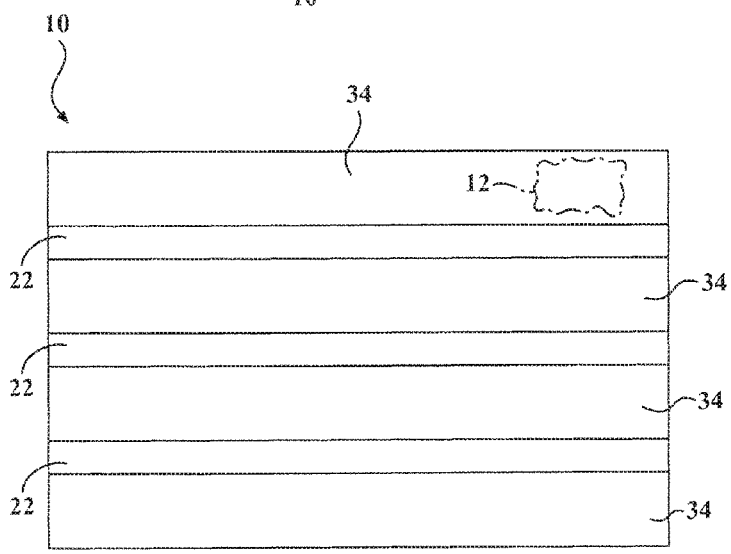
FIG. 15A
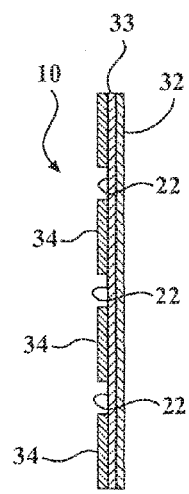
FIG. 15B

FIG. 16
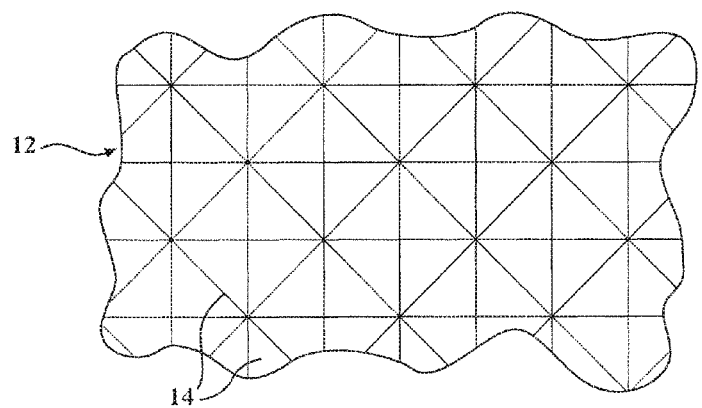
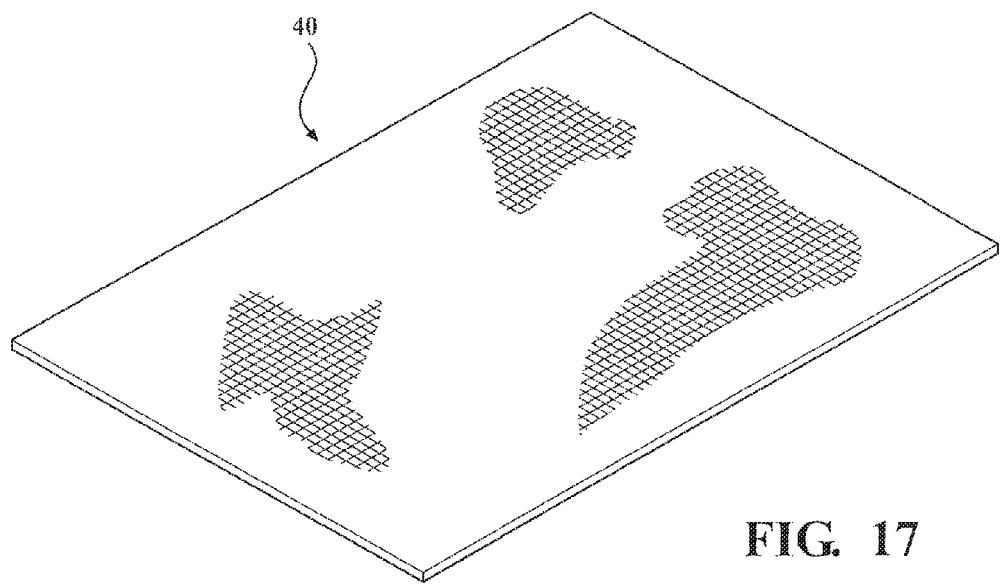
FIG. 17

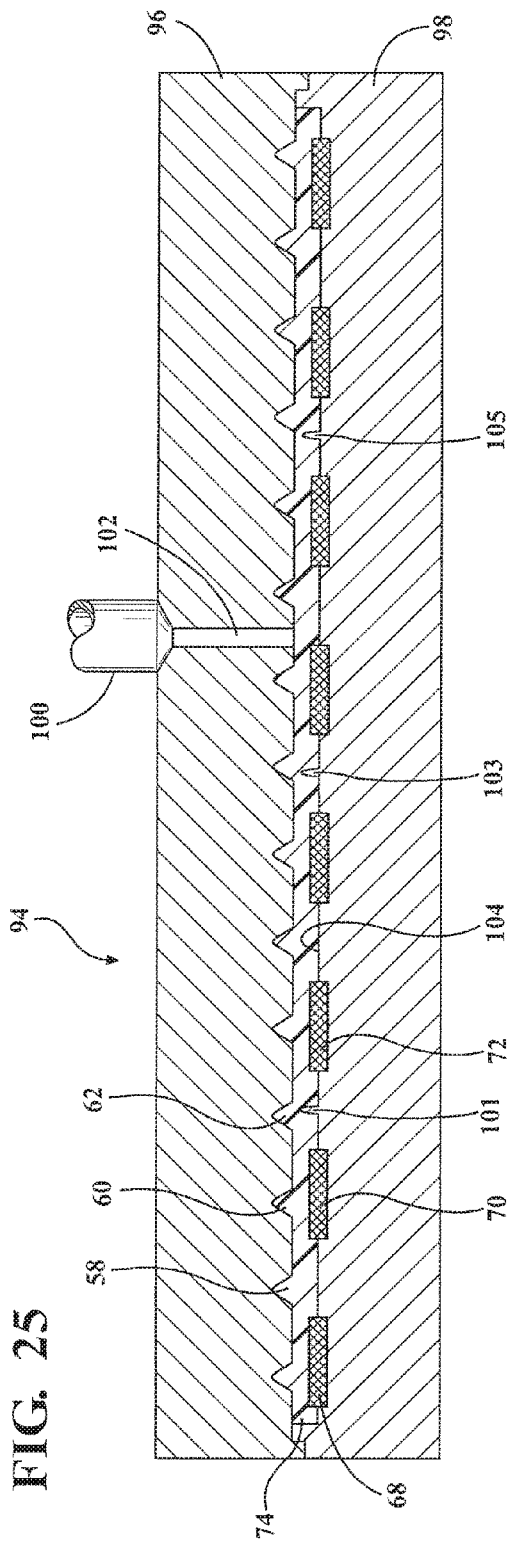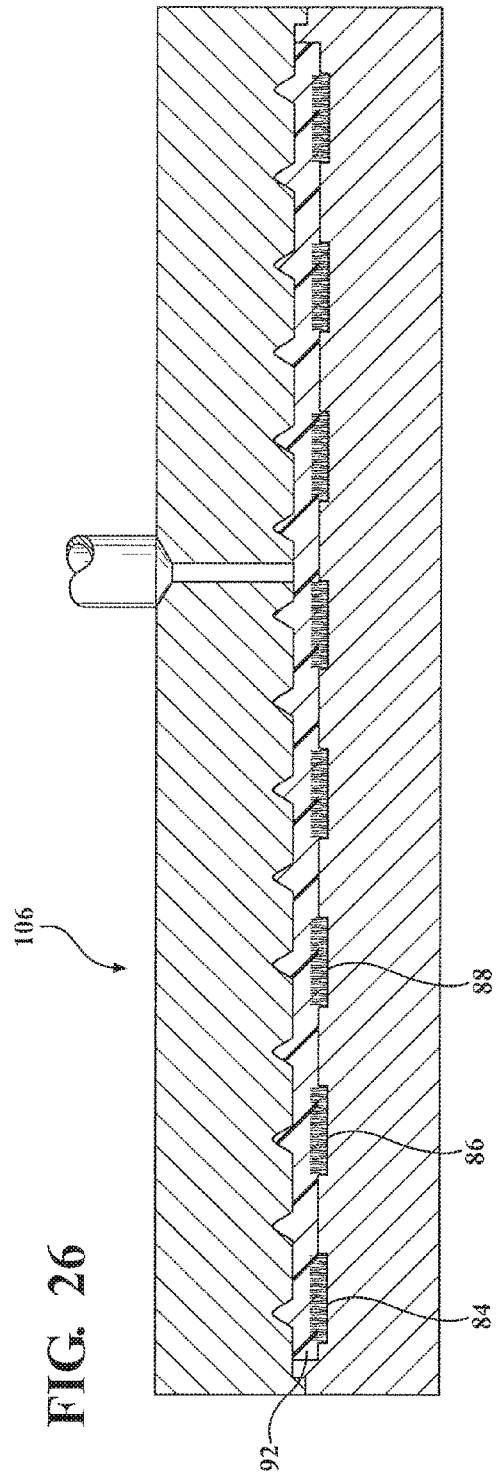

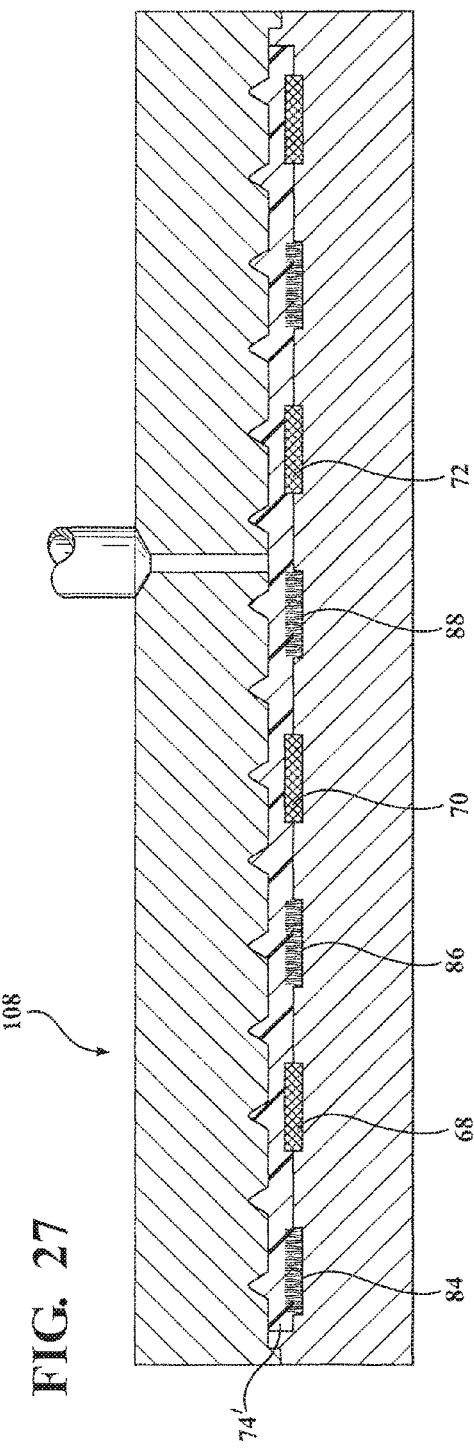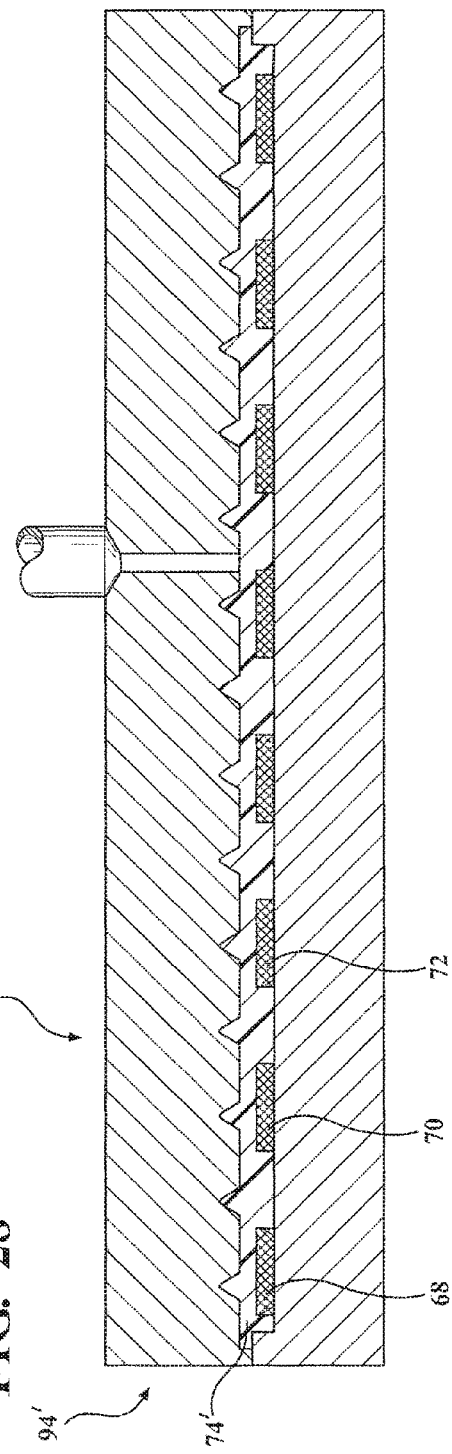

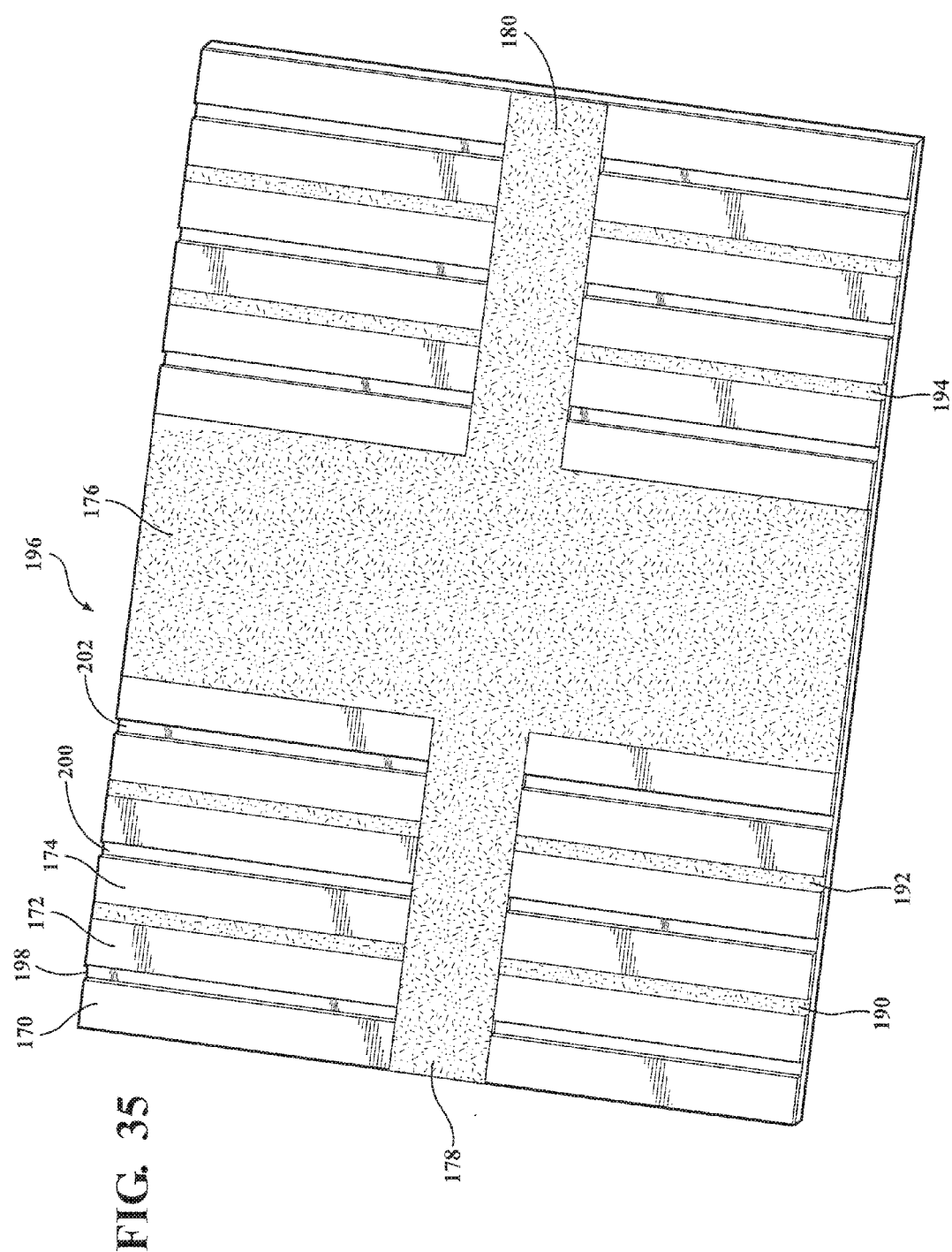

NON-SKID SAFETY MAT FOR PROVIDING ADHERING SUPPORT WHEN PLACED UPON A SLOPING ROOF

CROSS-REFERENCE TO RELATED APPLICATIONS

This application is a Continuation-in-part of application Ser. No. 14/531,274 filed on Nov. 3, 2014. Application Ser. No. 14/531,274 claims the benefit of U.S. Provisional Application 61/899,321 filed on Nov. 4, 2013, the contents or which are incorporated herein in their entirety.

FIELD OF THE INVENTION

The present invention discloses a mat, such as constructed of a neoprene or other rubberized or suitable nonskid surface material. Versions of the mat include both magnetic attracting and conformal contacting/draping adhesion configured undersides for placement upon any of a magnetic attracting or other roof material, and in order to provide nonskid support to a user standing on the roof, such having any slope or angle and during both wet and dry conditions. The mat can further integrate any type of hinged or flex capability which enables the mat to conform to any irregular surface associated with the roof. The mats are further typically provided in plural fashion and end-to-end or side-to-side arrayed fashion in order to provide any of a walkway or working surface upon the metal roof.

BACKGROUND OF THE INVENTION

In the field of construction, ascending or descending from sloped roofs, including both the metal and non-metal varieties, can be hazardous. Many injuries and some deaths occur each year. Safety and efficiency are key in construction productivity. Construction and weather conditions, may challenge the ability of workers to maintain a safe footing.

In the field of building construction, problems incurred with metal roofs notably include safety while standing or walking. A layer of dew, dust, or pollen can create conditions of great hazard for walking metal roofs.

Safety harnesses are required in many areas, yet a worker maintaining a comfortable foothold can still be a concern and, in the course of a work day, can cause leg, ankle, knee, back stress. Many workers on metal roofs have encountered slippery dangerous conditions and fallen. In cases of sudden foul weather, such as rain or snow, loss of footing may cause workers to slip and fall from roofs or be trapped there.

As such, ascending and descending and standing, kneeling or crawling on any metal roof, can be hazardous and cause many injuries and deaths each year. Safety and efficiency are key in worker productivity in dealing with construction and weather conditions in order to maintain a safer foothold such as during installation of material and equipment and in presence of such hazards as including any of water/oil/silicones on the surface.

Damage to finished/painted metal surfaces is often incurred due to falls of workers and hand tools, and equipment due to loss of footing. In the field of metal roof construction and maintenance, workers incur conditions of rain or dust, a hazard which may cause insecure footing and falls. Standing on pitched roofs for hours is fatiguing on leg and back muscles. Lanyards, harnesses, and rib clamps are used in ferritic metal roof construction, yet do little to relieve workers' footing and muscle stress. Also in weather conditions of mist, fog, or rain, safely ascending and descending a pitched metal roof is extremely difficult. Each year many workers are injured and sometimes die in falls from ferritic metal roofs.

It is also known that steel roofing today mimics most known roofing styles such as asphalt shingles, cedar shakes, slate, and terra cotta. Whereas asphalt roofing today is a landfill problem, steel roofing is recyclable. Steel roofing has a long term service capability of up to 60 years or more with good maintenance.

Steel roofing is 100% recyclable with high durability and long-term roofing effectiveness. It offers the option of changing color simply by painting and upgrading an old roof's appearance, thereby, holding a higher value to business and home owner's investment. Yet to workers, roofers, painters, and maintenance people, slipping and falling from steel roofs is very hazardous resulting in may injuries and deaths each year. There is a clear need for providing workers safer ways to walk/traverse steel roofs. Structures such as water towers, tractors, and ship decks also present a footing problem.

In the field of steel roofing, many of the current safety systems do not address footing, sitting in place, or kneeling down positions. Lanyards or harnesses to protect against falls do little to steady or provide secure footing. In conditions of a steep pitch steel roof 6/12 or more, leg and back fatigue from insecure footing can be extreme on workers. Similar problems with slippage of workers atop a non-metallic or magnetically attracting roof surface also exist and which are not adequately addressed by the existing prior art.

Accordingly, in view of the many hazardous and safety concerns associated with steel roofing and steel decking work, there is a clear need for an affordable, easy to use and safer footing system to be available to workers.

SUMMARY OF THE INVENTION

The present invention addresses better safety for workers and reduced damage to finished surface of a variety of roofs including both the metallic and non-metallic variety. It is further the object of the invention to provide a nonskid mat for surer footing for workers, reducing the number of injuries and providing better protection of finished surfaces associated with magnetic attracting and non-attracting roofs, such for instance from dropped tools or equipment falling from tool belts. With the mat design of the present invention, a safer and more assured foothold is achieved, the mats being easily moved in all environmental conditions to provide the user with a safer way of ascending and descending a roof with reduced risk of injury.

One type of mat includes magnetic adhering undersides which conform to any surface configuration of steel roof, such as which produces a wide variety of styles not limited to cedar shake, Spanish terra cotta, slate tile, and many others. The mats are further applicable to provide repositionable and antiskid support to any other ferritic metal surface, not limited to metallic decks on marine craft or the like. These and other objects and advantages of present invention are more readily apparent with reference to the detailed description and accompanying drawings.

In another variant, a non-magnetic version of the mat operates under the principles of draping or conformal adhesion (such as illustrated by the adhering underside toe pad configuration of the gecko). A reconfiguration and reapplication of this concept includes the provision of multiple and surface contact area increasing microfibers, such as setae (hairs or bristles) projecting from the underside of the mat.

Additional spatulae (nanometer scale projections covering the setae as is also known with gecko toe pads), can likewise be reconfigured into a conformal adhesion mat configuration such that the pluralities of setae/spatula bristles are adapted to adhere to the surface of the roof in order to dramatically increase surface area conformance and thereby maximize the generation of skid-resistant electronegativity forces (also termed Van der Waal forces).

As will be further described, the integration of the phenomena of draping adhesion to an anti-skid mat for use with a sloping roof permits the creation of conformal and skid resistant contact, and while maintaining high, elastic stiffness in downward sloping directions resisting to skidding. The directional skid-resistant aspect of the Van der Waal forces is further such that removal of the mat is accomplished by simply and effortlessly lifting the same in a direction opposite to the conformally adhering and skid resistant forces.

BRIEF DESCRIPTION OF THE DRAWINGS

Reference will now be made to the attached drawings, when read in combination with the following detailed descriptions, wherein like reference numerals refer to like parts throughout the several views, and in which:

FIGS. 8-10 illustrate a succession of views of an installation protocol for applying a plurality of nonskid mats upon a metal peaked roof construction;

FIGS. 11A-11B are perspective and side views of a safety mat according a further embodiment and which includes an upper-most nonskid (e.g. neoprene or other rubberized) material layer, (tear-resistant or ripstop fabric layer), an intermediate adhesive layer, and a plurality of subset spaced and underside attached magnetic strips;

FIG. 12 is an exploded view of the safety mat of FIGS. 11A-11B;

FIGS. 14A-14B are bottom and side view illustrations of a further variant of magnetic adhering safety mats such as which can exhibit any type of flex pattern for conforming when placed upon the metallic roof;

FIGS. 15A-15B are bottom and side view illustrations of a yet further and related variant of safety mats similar to FIGS. 14A-14B;

FIG. 16 is a sectional illustration taken from FIG. 15A and showing a quartered diamond style pattern associated with each of the flexible magnetic bottom layers in order to provide (greater) enhanced surface area contact when placed upon existing steel roofing, such as which can further exhibit a known imitation pattern not limited to cedar shake, terra cotta, slate tile or the like; and FIG. 17 is an illustration of a single layer chemical, self-assembled or extruded programmable particle material which can be constructed as a nonskid mat according to a further possible variant of the present invention;

FIG. 25 is a side cutaway view of an injection mold process for creating a mat having a plurality of underside embedded magnetic attracting portions or strips consistent with the mat designs of FIGS. 21-22;

FIG. 26 is a similar side cutaway view of an injection mold process for creating a mat having underside embedded conformal adhering portions/strips consistent with the mat design of FIG. 24;

FIG. 27 is a similar side cutaway view of an injection mold process for creating a mat having underside sub-pluralities of both magnetic and conformal adhering portions/strips consistent with the mat design of FIG. 23;

FIG. 28 is an illustration of an injection molding process for creating a mat which is a variant of FIG. 25 and in which the magnetic adhering underside portions/strips are embedded within the rubberized mat such that their exterior undersides are flush with the rubberized interconnecting matrix;

FIG. 35 is a yet further underside looking perspective of a combination variant of anti-skid mat with conformal adhering and magnetic attracting strips.

DETAILED DESCRIPTION OF THE PREFERRED EMBODIMENTS

As will be described in further detail with reference to the following illustrations, the present invention discloses a variety of different mat configurations, including both magnetically adhering mats and non-magnetic conformal adhering mats, as well as mats including combinations of both magnetic and non-magnetic adhering properties. As will be further described, the mats are constructed of any suitable nonskid surface material, and which incorporate any of magnetic or non-magnetic attracting undersides for placement upon any type of sloped or inclined ferritic and non-ferritic substrate such as a roof or other support surface.

In use, and as will be described with further reference to the following embodiments, the concepts of the invention are illustrated by the following figures. The figures are only meant to illustrate the concepts for the invention and in no way are intended to limit the scope of the invention in any manner.

The invention also discloses a plurality of similar configured mats which are continuously applied and repositioned in order to provide nonskid support to a user standing on a roof such as typically exhibiting any degree of angle or pitch, with the mats providing adequate magnetic holding forces against a magnetic attracting metal roof in either of wet and dry conditions. As will be additionally described, the mat can integrate any type of hinged or flex capability which enables the mat to conform to any irregular surface associated with such as a sheet metal roof construction.

Figure 1:
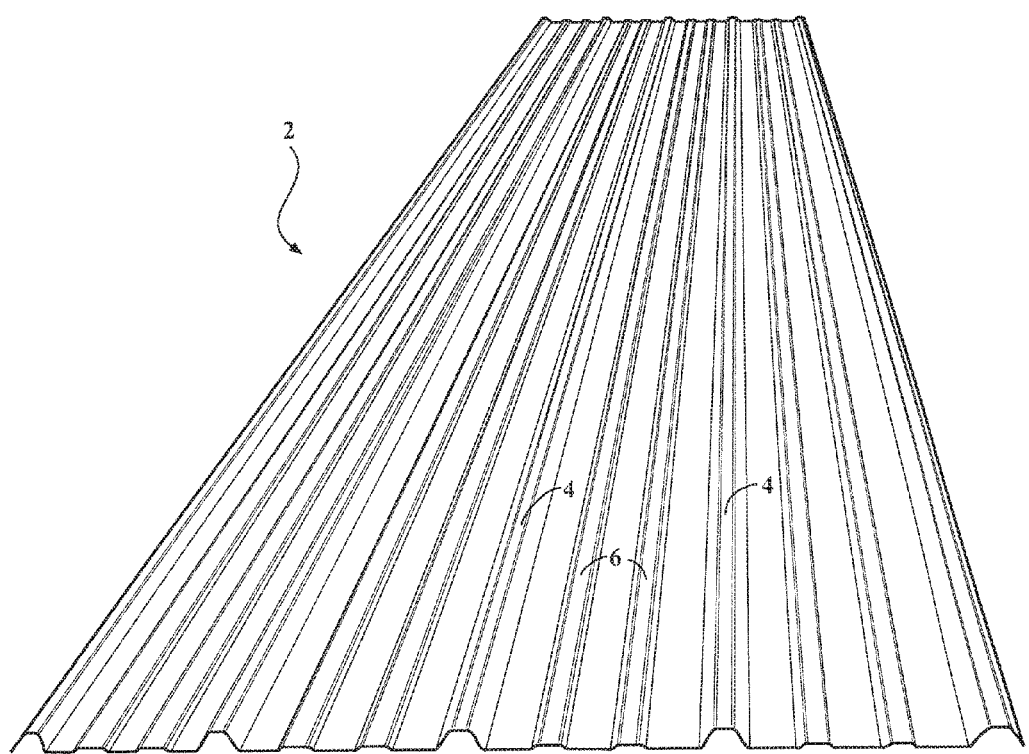
FIG. 1 is a side perspective of a sheet metal roof construction according to one known configuration and exhibiting an uneven surface profile.

Referring to FIG. 1, a side perspective is depicted of a sheet metal roof construction 2 according to one known configuration, and such as which can be of ferrite or other similar metal which exhibits desired magnetic attracting properties. Further shown in the selected example of the roofing construction 2 is any arrangement of structure associated with such as a stamped or otherwise configured sheet metal, this including such as alternating ribs 4, between which are located valleys with any further surfacing profiles 6. As will be described in reference to succeeding variants, the sheet metal configurations with which the present invention can be utilized can vary from that shown.

Figure 2:
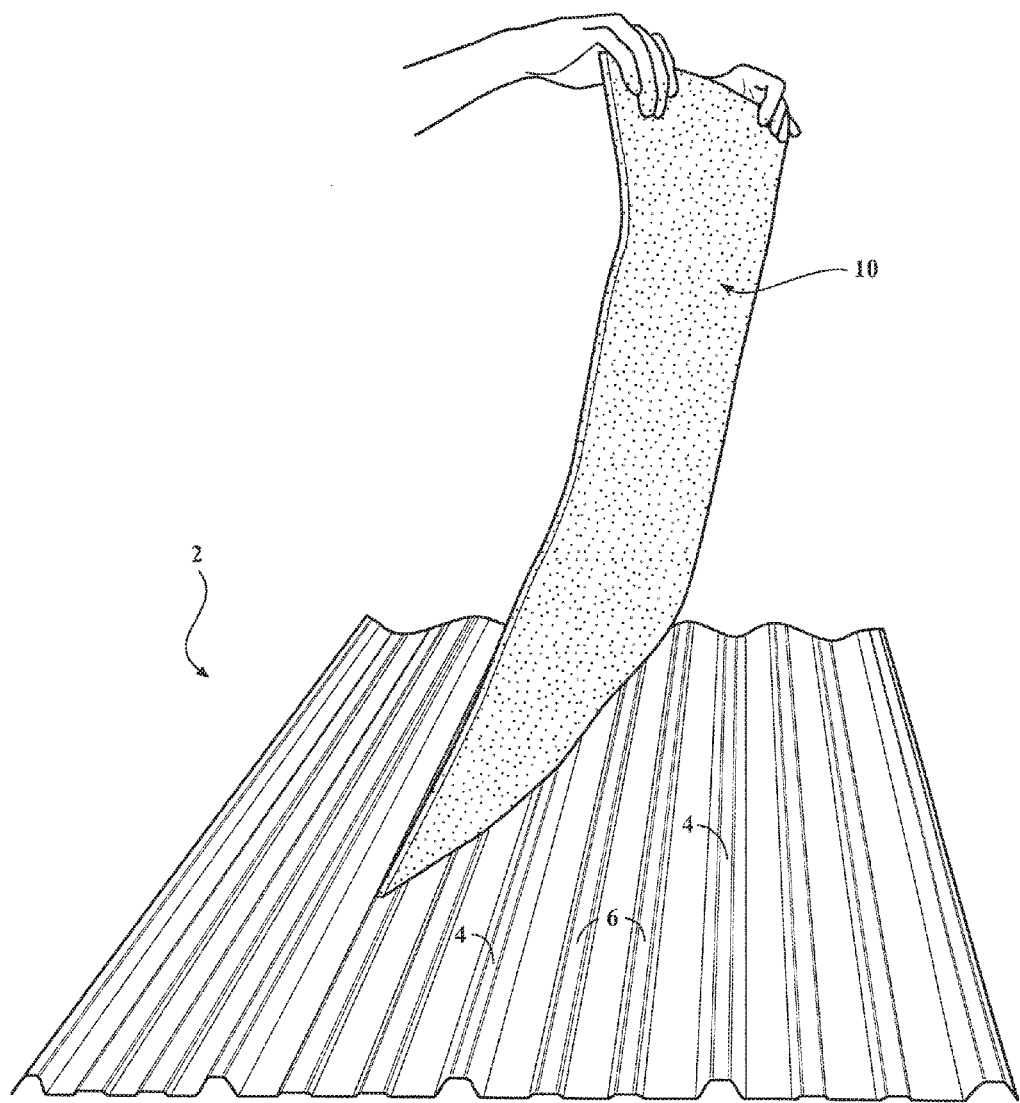
FIG. 2 is an illustration of the safety mat in a pre-applied position.

Referring to FIG. 2, an illustration is, as an example of a fully assembled safety mat 10 according to one non-limiting variant arranged in a pre-applied position relative to the metal roof 2. The safety mat exhibits a generally planar shape with any length and width dimension, and which can include, without limitation, any desired thickness such as in a range of 1/8" to 1/2".

In one non-limiting variant, the individual mats can exhibit dimensions provided in any plurality in order to cover a suitable area of the metal sheeting of the roof necessary for safely supporting the user thereupon. Without limitation, the shape, thickness and configuration of the mat is capable of being modified in order to provide a maximum degree of adhering (further defined as antiskid or shear force limiting) support upon the roof surface. This can include without limitation such as reconfiguring the individual magnetic sections in a quartered diamond or other suitable shape. Reference is also made to blown up view 12 depicted in FIG. 16.

Material constructions associated with the mat can include any suitable flexible material having sufficient nonskid surface properties, such as without limitation neoprene or other polymer based materials. Neoprene or poly-chloroprene is a family of synthetic rubbers that are produced by polymerization of chloroprene. Neoprene exhibits good chemical stability and maintains flexibility over a wide temperature range and, in the present application, provides the advantages of exhibiting good exterior and antiskid characteristics in either wet or dry conditions, along with limited stretchability. The purpose of the surface material used, regardless of construction, is to provide both nonskid support to the user when standing thereupon as well as to provide the necessary flexibility during application and successive repositioning upon the ferritic metal roof.

The mat 10 further includes a magnetic adhering underside layer, such as again best represented by the grid shaped material 14 depicted in FIG. 16. As will be described in further detail with reference to subsequent embodiments as in the underside view of magnetic strips 16 in FIG. 7. The construction of the mat is such that the backing magnetic layer can include, without limitation, and number of individual magnetic elements, such as flexible magnetic sheets or materials which can be integrated into the mat at spaced intervals in underside facing manner. Reference is also made to FIGS. 14A-14B and FIGS. 15A-15B. Alternately, a continuous magnetic (underside) layer 18 can be provided as illustrated in FIG. 13 and which is attached to an underside of neoprene strips or other suitable surfacing (antiskid) material such as by gluing, heat bonding or the like.

Figure 3:
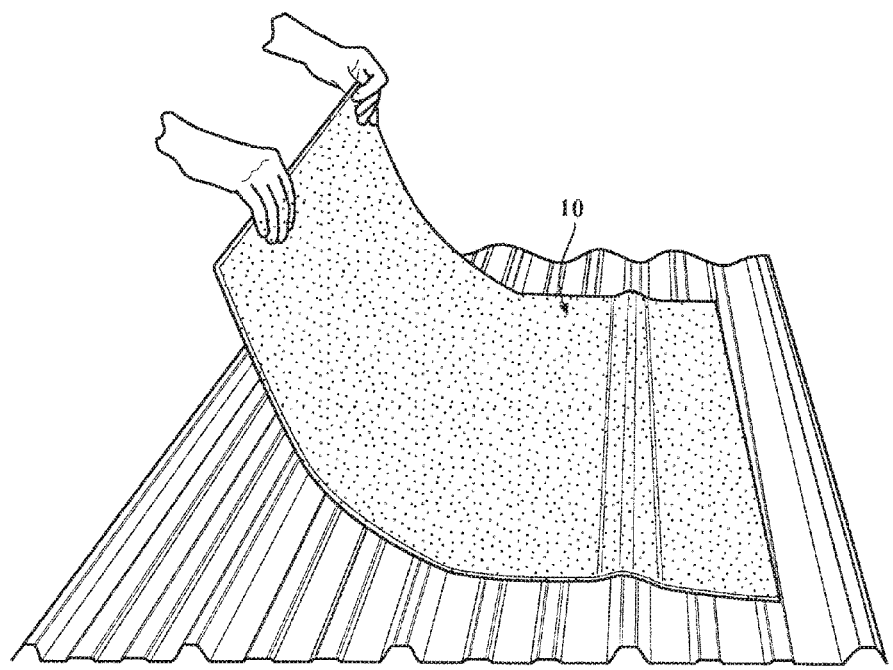
FIGS. 3-4 are successive illustrations of the safety mat in an intermediate applied and adhering position upon the metal roof.
Figure 4:
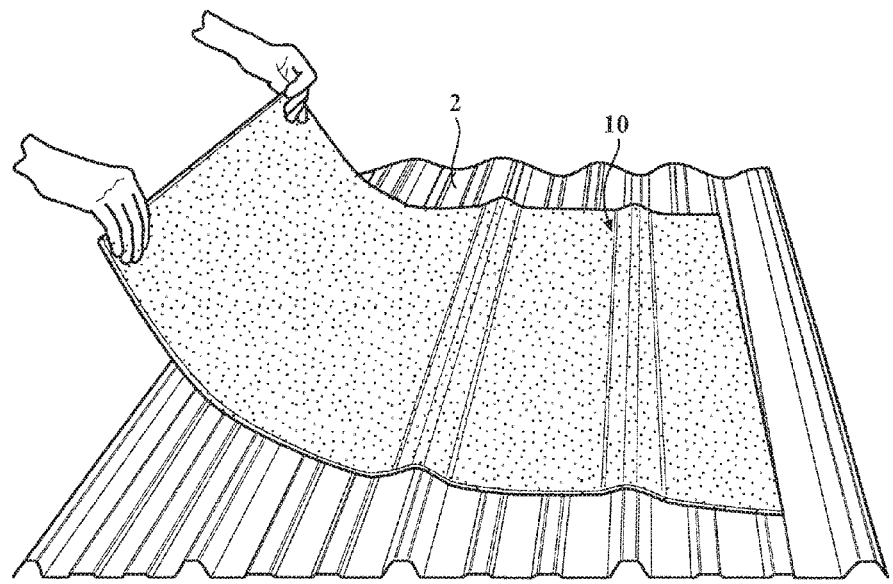
Figure 5:
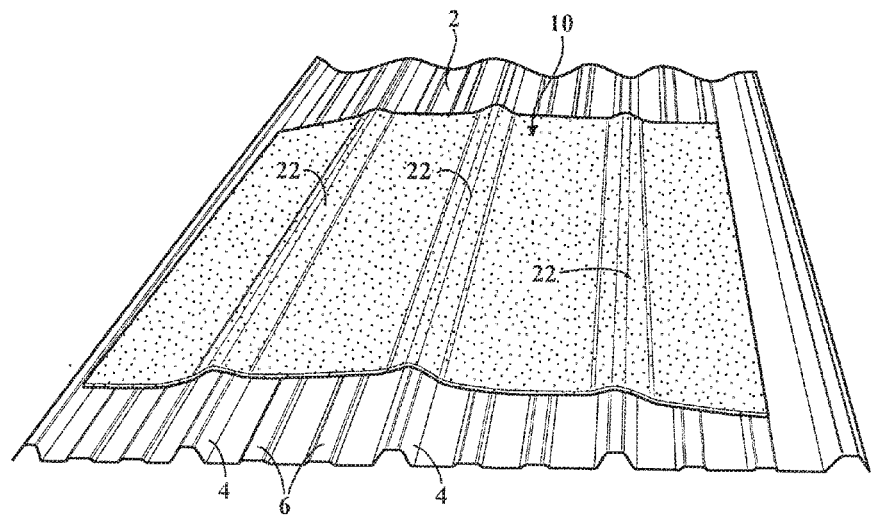
FIG. 5 is a fully applied illustration of the safety mat magnetically adhered to the metal roof exterior.

FIGS. 3-5 are successive illustrations of the safety mat 10 in each of pre-applied, intermediate applied and installed/adhering positions upon the metal roof 2. As best shown in FIG. 5, the flexible construction of the mat 10 is such that, upon it being magnetically adhered to the exterior surface of the roof 2, it exhibits a plurality of hinged or pivot locations, see at 22 which enables the mat to conform to the surface profile of the metal roof 2, as well as the subsequent roof design 2' of FIG. 6 (commercially referred to as corrugated steel roofing) which exhibits a continuous reverse angled and corrugated appearance (see angled portions 3, 5, 7, et seq.) without the existence of any flattened locations.

The present invention contemplates the individual mats capable of exhibiting any flexible profile or configurations, and as such as which can be tailored where necessary in order to adequately conform the mat to the given surface profile of the roof 2. To this end, the flexible material incorporated into the mat construction can exhibit any arrangement of fold lines or bends, such as which are also known as living hinges, in order to accommodate the specified profile of the metal roof 2 and in order to provide an adequate and nonskid platform for the user. The magnetic underside layer can further include any corresponding spacing or reconfiguration, such as including providing the attracting layer as a plurality of individual magnetic strips in spaced fashion, and in order to match the profile of the metal roof surface.

Figure 13:
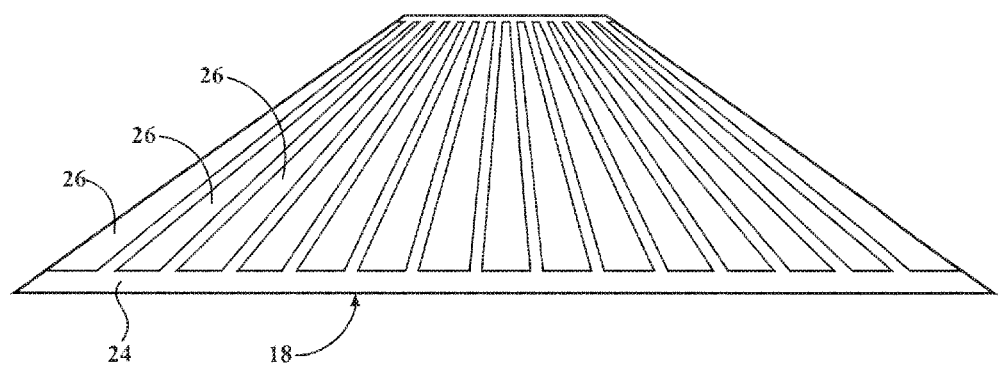
FIG. 13 is an illustration of a full layer of magnetic backing material in a generally grid profile nonskid strips according to one non-limiting configuration of the present invention.

The full magnetic attracting underside layer 18, such as again shown in FIG. 13, can (without limitation) also be configured with a grid design such as incorporating a multi (four) sided outer form or perimeter 24, between which extend individual strips or lengths of nonskid portions 26 the configuration of which facilitates bending or articulating when placed upon any irregular or peak/valley surface profile associated with the corrugated steel roof. The underside layer 18 can also be adhered (such as by gluing as depicted by adhesive layers or strips 28 and 30 in FIG. 12) to the underside of the skid-resistant (e.g. neoprene) mat 10, in order to provide the desired properties of grip and flexible/hinged construction of the mat 10 to accommodate a given metal roof surface profile.

Figure 8:
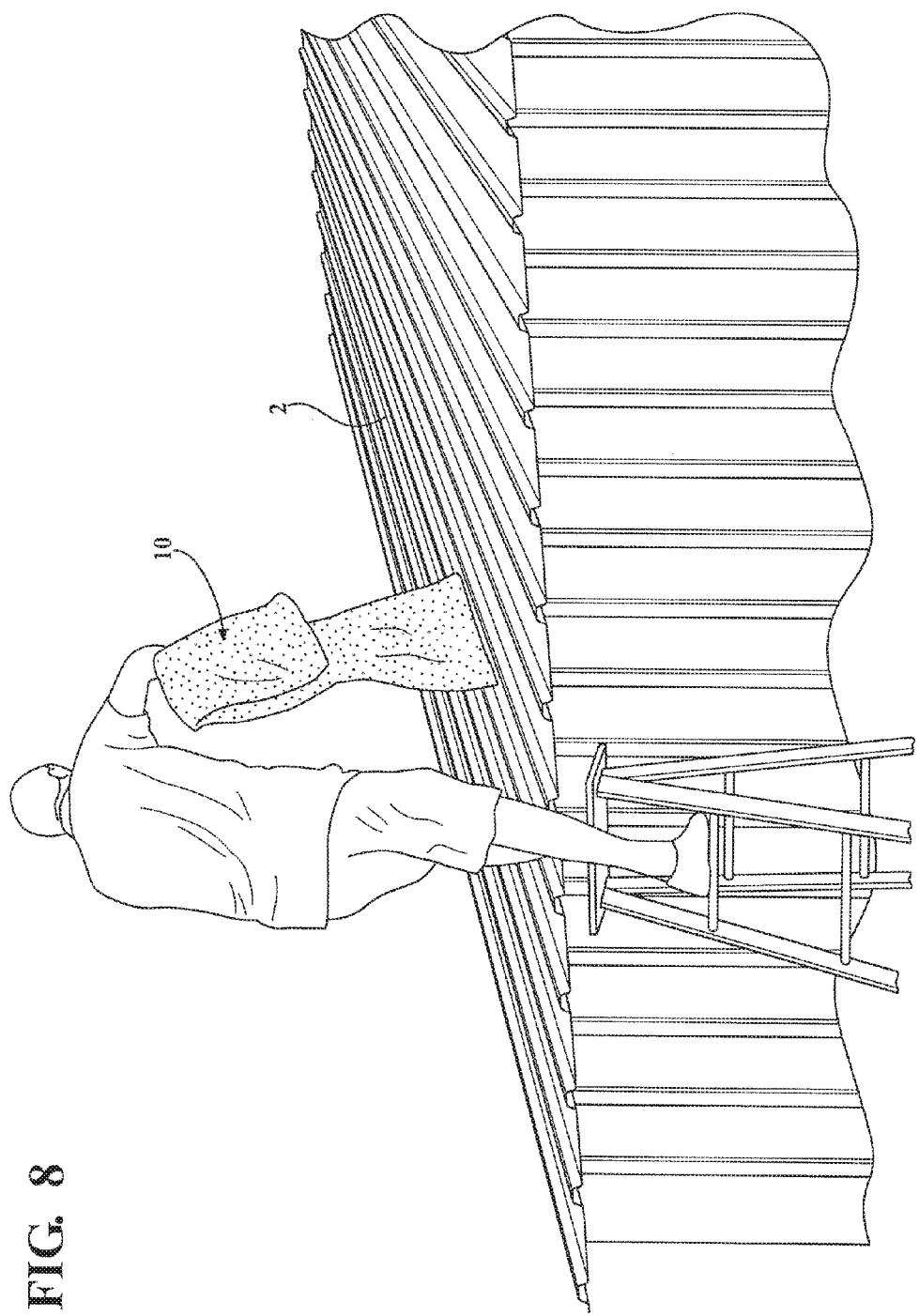
Figure 9:
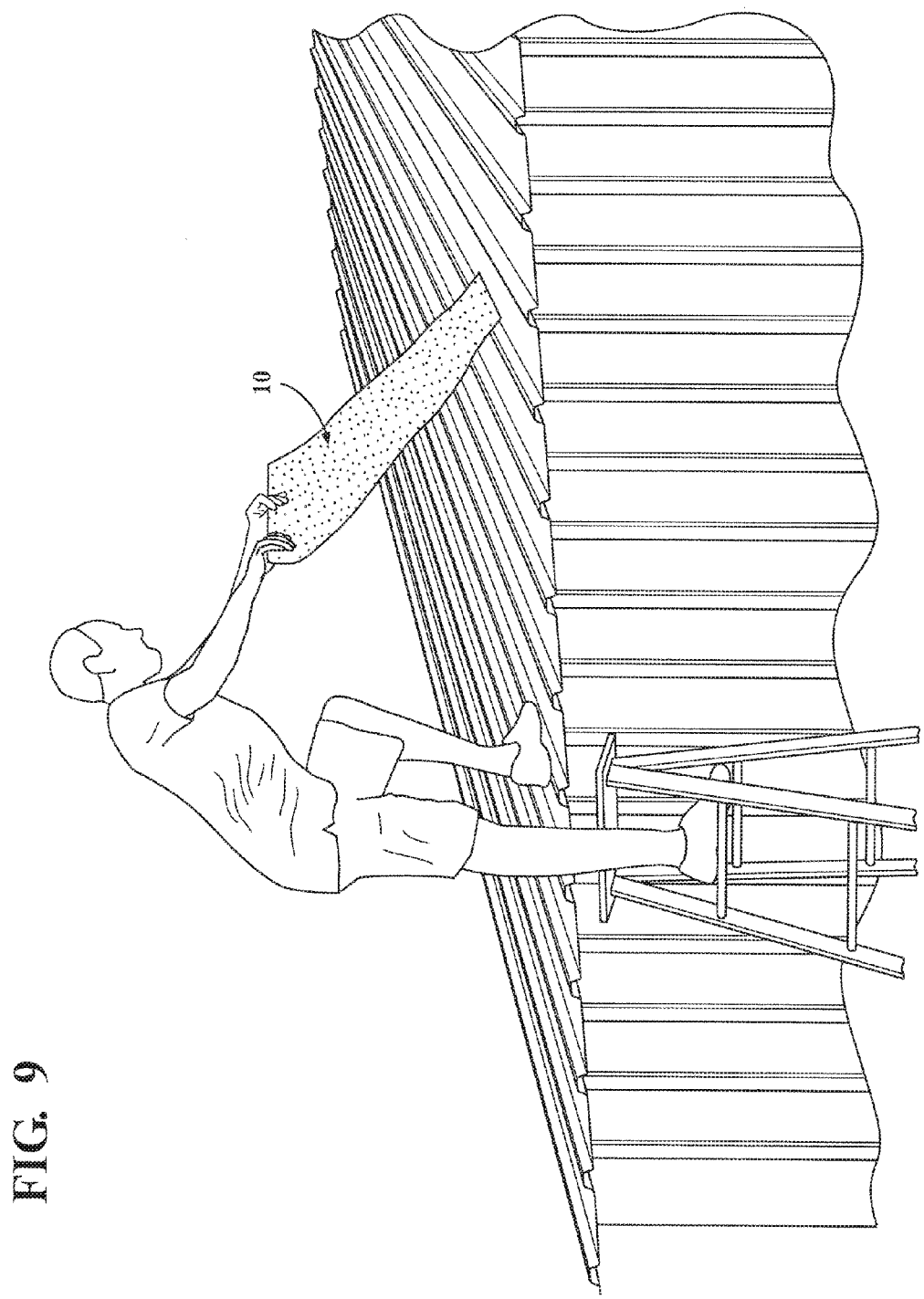

FIGS. 8-10 present a further series of environmental perspective views illustrating the application of the mat 10 onto the sheet metal roofing construction 2, consistent with that previously depicted in FIG. 2-5, according to the known art and which again exhibits multiple and reverse angled bends, this best shown in the assemble view of FIG. 10 and by which a user 1 is capable of standing upon the slip-resistant exterior surface of the mat 10 without the mat shearing or slipping relative to the metal roof, again due to the consistent magnetic attracting profile established across the magnetic surface area of the mat with the underlying roof. As previously described, the construction of the mats are such that they provide adequate non-slipping magnetic attracting forces when placed upon the metal roof surface, with the antiskid upper surface further establishing secure footing to the user standing there upon, such as in the instances of either wet or dry weather.

Aside from providing a solid foothold provided by the magnetically adhering mats further assists in reducing body stress and accidents. The mats are further designed to be easily moved and repositioned across the metal roof by the user using a plurality of mats while supported thereupon.

Figure 7:
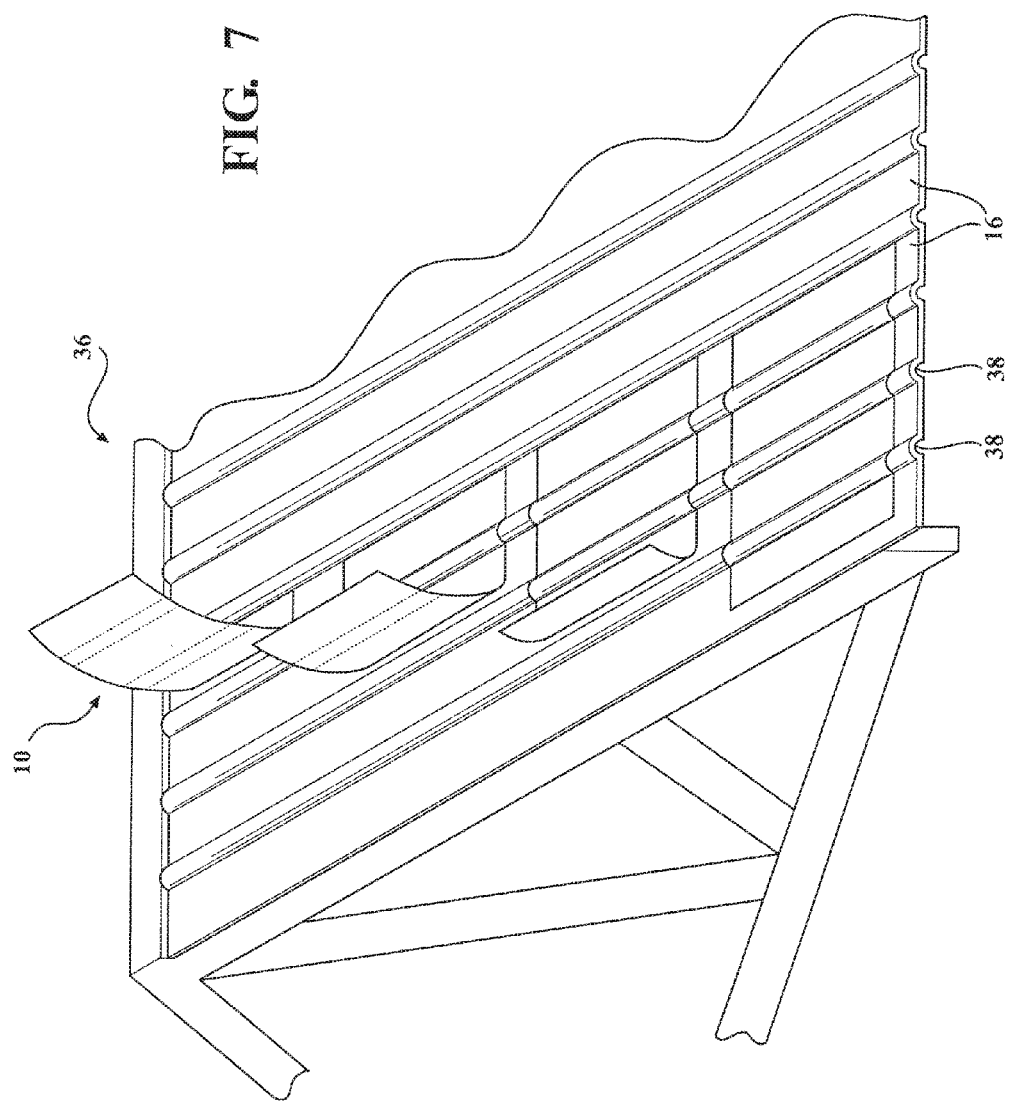
FIG. 7 is a further assembly protocol utilizing the safety mats of FIGS. 11-12 and illustrating the manner in which the mats can be applied to the sheet metal roofing in order to provide a more secure walkway surface.

The present invention further provides an effective method for applying a plurality of mats upon a metal roof surface, depicted in FIG. 7, such as including the steps of reposition-ably adjusting any plurality of individual mats in end-to-end and/or side-by-side fashion upon the metal roof, and as such as to permit the user to walk between any desired points in a more secure fashion. The elevations or peaks of the metal roof sheeting 4 in FIG. 5 are accommodated by the design of the living hinge 14, mat 10, FIG. 5 by conforming to the peaks, providing better surface contact, thereby, further assisting in providing antiskid support to the user.

Proceeding to FIGS. 11A-11B and FIG. 12, a series of perspective, side and exploded views are respectively shown of a safety mat 20 according to a further embodiment, which includes an upper-most nonskid material layer 32, an intermediate adhesive layer 33 and a plurality of subset spaced and underside attached magnetic strips 34, the intermediate 33 and underside magnetic strips 34 as shown each including an adhesive covering as depicted at 28 and 30. The upper layer 32 can again exhibit any nonskid rubberized consistency and can exhibit any thickness, such as ⅛". The intermediate adhesive coated layer 33 can further include, without limitation, any type of tear-resistant material, also termed a rip-stop fabric, such as exhibits flexural properties. In combination with the upper surface attached neoprene or neoprene coated material layer 32 (also understood to include any other potential skid-resistant and flexible material) the intermediate rip-stop 33 adhesive layer 30 and the lower attached magnetic strips 34 provide any desired degree of flex/bend in application.

FIG. 7 illustrates, generally at 36, a further assembly protocol utilizing the safety mats according to any of the embodiments described herein, with a plurality of four such mats 10 being referenced. Consistent with the previous figure descriptions of FIGS. 8-10, a plurality of mats 10 can be placed in successive and spaced fashion to provide a more secure walkway surface for an individual upon the typically (but not necessarily) peaked and angled profile established by the metal roofing construction, a further configuration of which is shown at 38, FIG. 7.

The metal roof 36 as shown FIG. 7 further includes a plurality of alternately configured and spaced apart side profiles, these depicted by semi-circular shaped profiles or configuration 38, and over which the mats 10 are capable of closely and snugly adhering, again due in part to the flexible nature of both the upper skid-resistant layer 32, in FIG. 11A-11B, intermediate rip-stop fabric layer 33, adhesively affixed layer 30, affixed to lower magnetic strips 34, which can again be spaced apart as shown in FIGS. 11-12. The spaced arrangement and location of the magnetic strips can further be configured for other metal roofing profiles.

Without limitation, the mat 10 in FIGS. 14B and 15B can be configured such that the magnetic strips 34 can include flexural patterning so that they provide enhanced gripping upon the flattened or irregular metal surfaces associated with the type of metal roofing installations such as faux and non-traditional patterning. As with previous variants, and as will be further described, the spaced apart configuration of the magnetic strips define living hinge locations 14 the configuration and arrangement of which can further be modified in order to maintain enhanced magnetic grip while requiring minimal lift force for moving and replacing mats.

It is further understood that any of the number, arrangement and/or profile of the magnetic strips can be modified as in sectional view 12, FIG. 15A with the scope of the invention in order to provide any desired gripping characteristics such as the quartered diamond pattern 14 shown in the enlarged view of FIG. 16, for a given surface configuration of a metal roof.

FIG. 16 is a sectional illustration taken from FIG. 15A and once again showing a quartered diamond style of pattern of individual magnets associated with each of a more flexible magnetic bottom layer (see selected strip, portion or layer as defined at phantom outline 12 of FIG. 15 A). Such a pattern can be limited to just the magnetic strips, or can be further integrated into the upper rubberized neoprene layers. This in order to provide an increased degree of flex or bend and thereby establish greater or enhanced surface area contact when placed upon an existing steel roof 2. Although not shown, it is further understood that existing metal roofing 2, apart from exhibiting any of the profiles shown herein, can further be produced with any of a texturized or otherwise decorated surface which can exhibit an imitation steel roofing pattern not limited to any of cedar shake, terra cotta, slate tile, asphalt-like shingle or the like.

FIG. 17, is a non-limiting embodiment illustration of a single layer chemical, self-assembled or extruded programmable particle material, and/or 3D printer produced representation of the invention in a sheet mat for mat 40 and which can again include any desired dimensions with a suitable thickness (typically at least ⅛ of an inch or more). The unique construction of the mat 40 is further understood to provide combined magnetic adherence to the metal roof surface, as well as adequate nonskid shear-resistant surface mat embodiment support to a user, similar to that established by any of the multi-layer configurations described herein.

With further reference to the subsequent description of FIGS. 25-28, it is understood that any suitable injection molding or extrusion process can be employed for creating the desired mat configuration. It is further envisioned that, as part of the matrix or construction of such as single layer mat, a flexural grid or other internal support can be integrated into the material construction in order to provide enhanced strength while retaining the desired flex hinge aspects.

Figure 6:
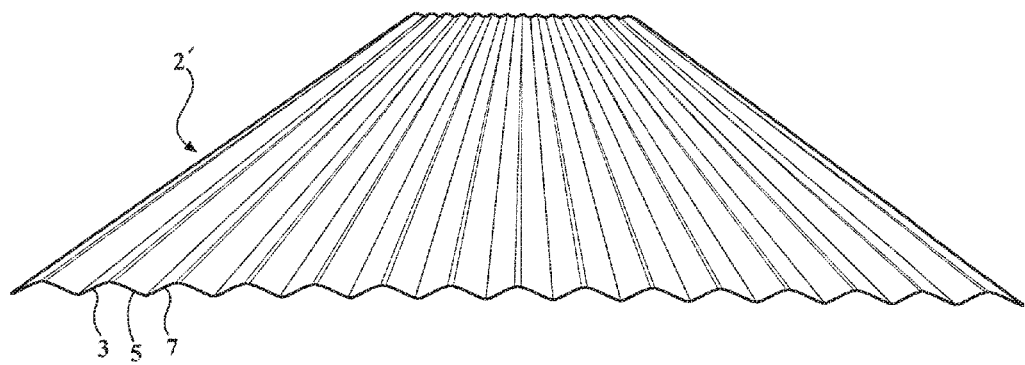
FIG. 6 is a upper perspective of another variant of alternating peak and valley sheet metal roofing construction, further to that depicted in FIGS. 1-5.
Figure 18:
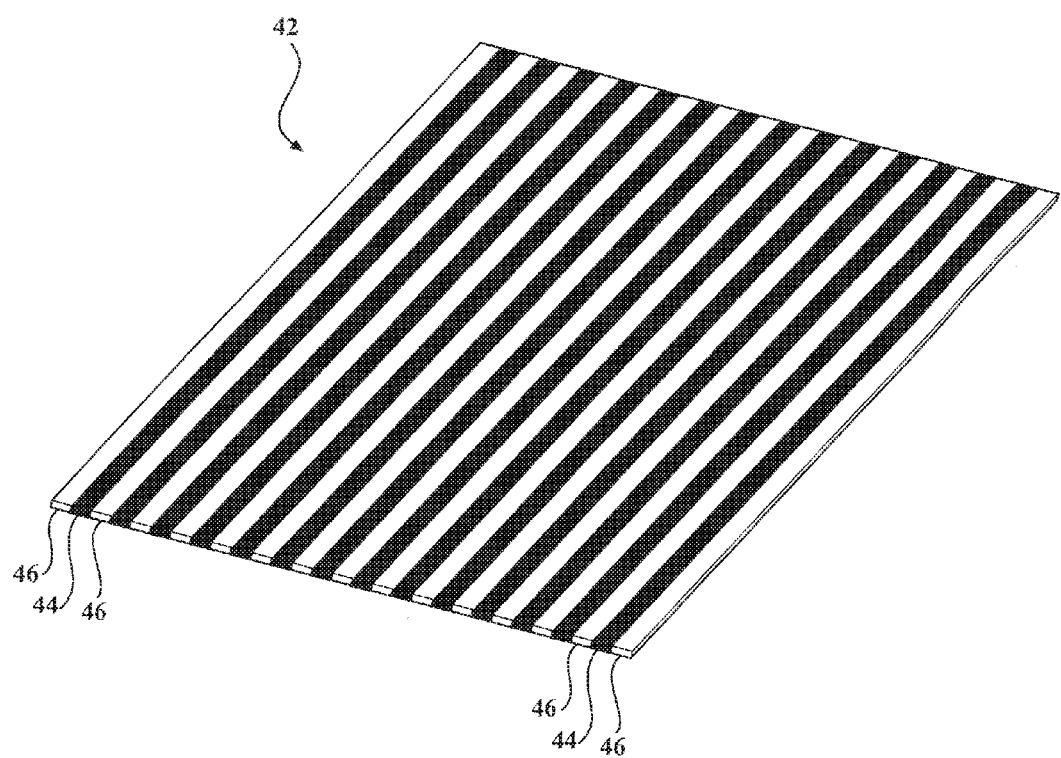
FIG. 18 is an illustration of another single layer mat design incorporating a first plurality of skid-resistant strips/portions in combination with an alternating second plurality of flex-hinged connecting and magnetic strips/portions.

FIG. 18 is an illustration of another single layer mat design, generally at 42, incorporating a first plurality of skid-resistant strips/portions 44 (these additionally providing living hinge functionality) in combination with an alternating second plurality of flex-hinged connecting and magnetic strips/portions, at 46, the mat configuration of FIG. 18 being particularly suited for providing nonskid support when placed upon the continuous reverse-angled roof design 2 of FIG. 6, it being understood that other configurations are envisioned for supporting upon and gripping other roof surfaces not limited to those depicted herein.

Similar to FIG. 17, the single layer design of FIG. 18 can be produced in a suitable material forming process, such in this instance, contemplating the magnetic strips being pre-placed in their desired spaced apart manner within a mold interior, following which the skid-resistant strips are injected in-between. A variation of this design can further envision the spaced magnetic strips 46 being embedded within a thicker skid-resistant layer 44 (the magnetic strips effectively seating within underside facing pockets created within the injection molded or like formed rubberized layer).

Without limitation, the present invention contemplates any mat design, having one or more layers, which are constructed of any rubberized or other skid-resistant material, further any mesh, weave, injection molding, 3D printing, extrusion, or other flexible article, and which further include magnetic/adhering aspects which are either incorporated into a single layer design or configured as additional strips or portions adhered to an underside surface of the mat, this in order to provide both enhance gripping to the metal roof surface as well as to accommodate the variances in the surface configuration of the metal. To this end, the design of the mat and its magnetic adhering portions can be modified in any way desired in order to establish flex locations between any such peaks and valleys in the metal roofing in order to maximize the effective surface area of magnetic attraction in order to minimize instance of slippage or shear of the mat when placed upon the ferritic metal roof.

For the purpose of constructing one style mat as is shown in FIG. 12, includes a cut 21"×32" sheet of neoprene nonskid rubber, a sheet of equal size tear or abrasion resistant fabric (such as ripstop), cut (see quantity of four at 34 each such as 5"×21" in dimension) strips of 5/32" flexible magnetic sheeting. Using flexible PVC glue, a layer of adhesive is applied to a bottom side of the neoprene sheeting and a layer of adhesive to one side of the ripstop fabric. The adhesive layer sides are then placed together along their opposing and aligning edges. A layer of adhesive is applied to the non-magnetic side of the magnetic strips and then to the underside of the ripstop fabric underside. Magnets are then adhered at outside edges of corresponding length and place remaining strips evenly from each other creating the living hinge 22, as in FIG. 11A, and as depicted in FIG. 1-5. This design of the completed mat 10 may be used on a steel sheet metal roof with peak or rib lines separated by 7" to 9" on center.

Figure 19:
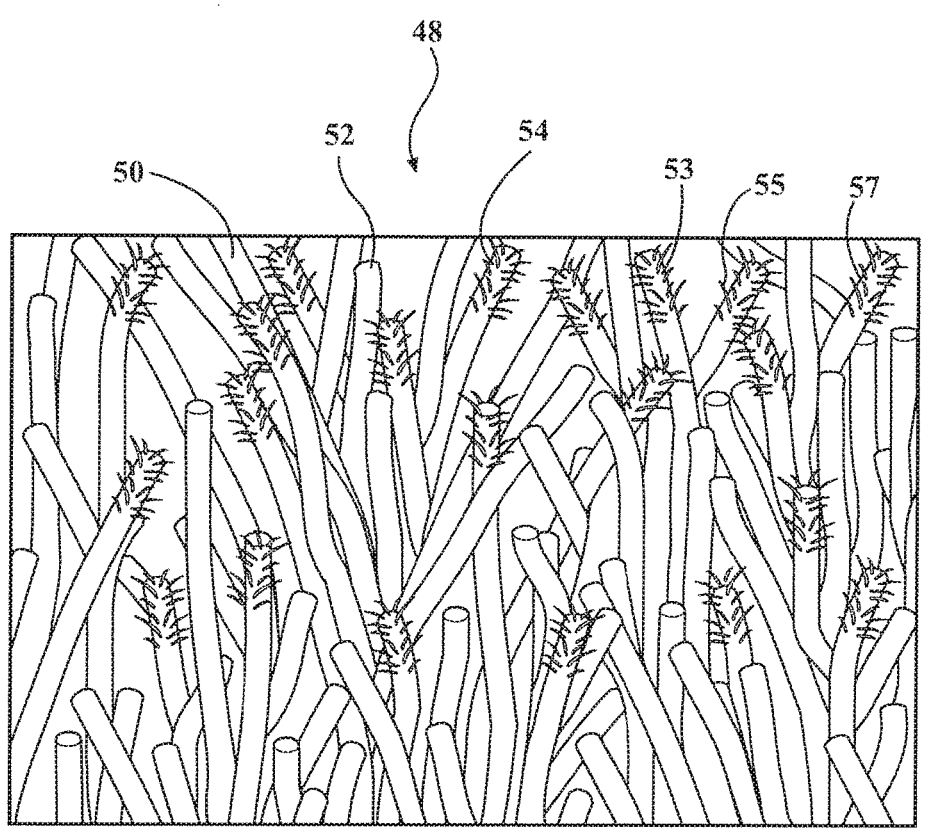
FIG. 19 is an illustration of a plurality of microscopic sized synthetic polymer fibers, such as which project from an underside surface of an anti-skid mat according to a further variant and which replicate the conformal/draping adhesion properties of setae/spatulae incorporated into a gecko toe pad.

Proceeding to FIG. 19, an illustration is generally shown at 48 of a plurality of microscopic sized synthetic polymer fibers, see further at 50, 52, 54, et seq (such also contemplating the use of nylon or carbon fibers of varying stiffness). As will be further disclosed in reference to FIGS. 23, 24 and 30-35, the stiff fibers are configured to project from an underside surface of a rubberized or other draping/conforming conforming anti-skid mat according to a variety of further variants.

For purposes of accurately replicating the setae/spatulae configuration of such as a Gecko pad, the tubular shaped fibers 50, 52, 54 can each further include intermittent branching or leafing structures, see further as shown at 53, 55, 57 branching off similarly constructed micro-fibril tubular base structures as again shown in FIG. 19. It is understood that the precise structure of the microfibers, as further described below, can be varied from that shown while substantially maintaining their conformal adhering properties.

The stiff fibers replicate the conformal/draping adhesion properties of setae/spatulae microscopic bristles incorporated into a gecko toe pad. Without limitation, the synthetic fibers shown can include any scale or size, such in one non-limiting instance each averaging a given height measured in micrometers and a further width measured in nanometers, with a corresponding dimensional ratio of 10:1 to 50:1 between the respective height and width measurements. These dimensional ratios can also apply to measurements in micron scale (e.g. fibers that in one non-limiting instance can be less than 1 micron in diameter and 20 microns in height which averages to less than ⅕ the thickness of a sheet of paper).

In terms of scale, a typical microfiber is approximately 100 times smaller than a human hair such that approximately 40 million such fibers can be situated upon a one square centimeter surfaces area (or 250 million fibers per square inch). As will be further described, the microfibers (in combination with the flexible/draping aspect of the underlying base layer material) engage any even or uneven surface profile such as associated with a sloped roofing application, and by which such an opposing and compressive load (e.g. the mat placed upon the roof surface such that the microfibers contact the roof surface) upon coming into contact with the bristles 50, 52, 54, et seq. causes the same to be deflected/bent into individual surface area increasing contact with the underlying roof surface area.

As is further known, Van der Waal forces of frictional resistance operate under the principal of establishing surface molecular bonding between the constantly moving electron clouds associated between opposing surface molecules, the weakest version of these also being known as London dispersion forces and which are constituted by persisting slight charge imbalances between the respective electron clouds which create the attraction force. This surface molecular bonding is enhanced by increasing the effective contact area established between the respective materials (i.e. the term "draping adhesion") and which is further evidenced by enhancing the size and concurrent area of conformal contact established between the stiff microfibers and the opposing roof surface to provide anti-skid adhesion of the mat relative to the roof. In this fashion, the known physical properties of draping adhesion can be applied to a variety of anti-skid mat applications as described below and which provide for adequate holding and retaining forces applied to such a mat supported upon a sloping roof surface of any material construction (not limited to metallic/magnetic attracting), such a roof surface also potentially including any type of material also having any irregular surface profile.

Figure 20:
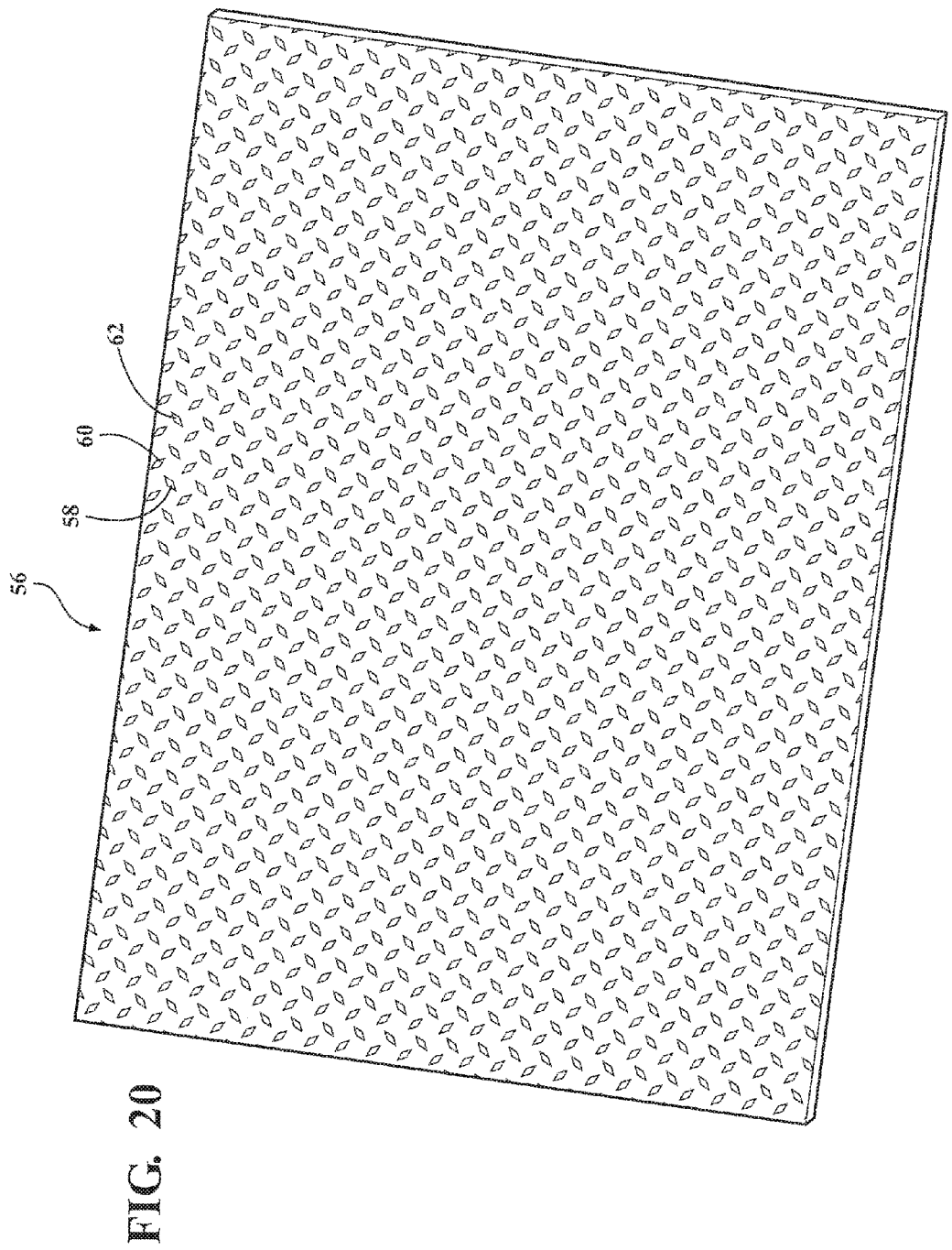
FIG. 20 is an illustration of a textured and anti-slip exterior surface of a mat according to a further variant.

Proceeding to FIG. 20, an illustration is provided generally at 56 of a textured and anti-slip exterior surface of a mat according to a further variant, such as which can exhibit a diamond or other pattern of anti-slip protruding portions at 58, 60, 62, et seq. exhibited on its upwardly/exteriorly facing surface (also referenced as a diamond deck rubber top side). The mat and the surface anti-skid textured, embossed or protrusion patterns can be constructed of any rubberized, flexible and anti-skid material, such as which includes a thin planar and rectangular shaped sheet of dimensions consistent with that previously described and which can be rolled or unrolled, and further which, in combination with flex or hinge lines, is configured upon its adhering undersides with either or both of magnetic or conformal attracting portions.

Figure 21:
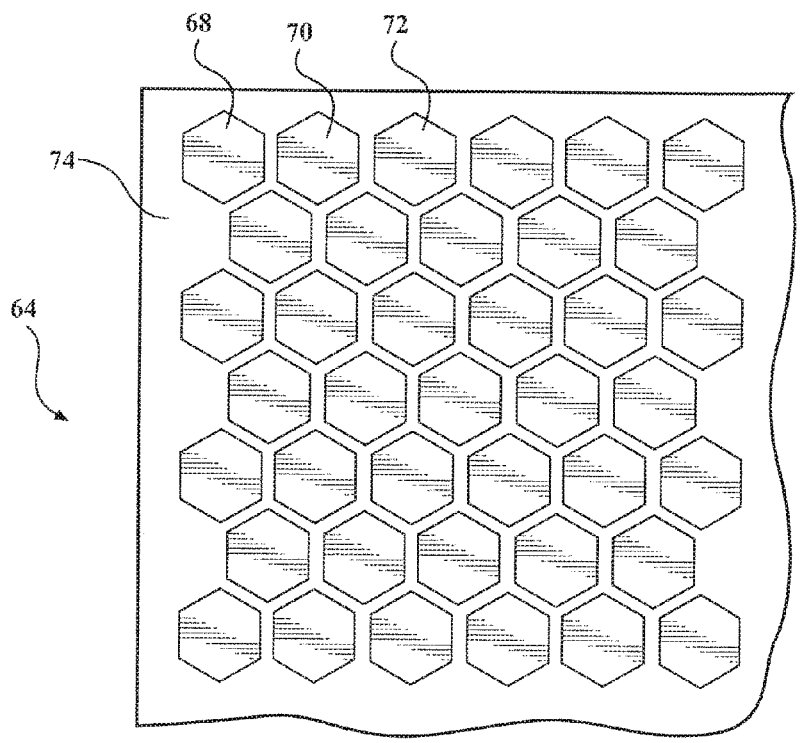
FIGS. 21-22 are sectional partial plan views of additional mat designs and illustrating pluralities of magnetic portions having either of hexagonal/polygonal or circular edge profiles and which are embedded within a flexible planar and rubberized mat.
Figure 22:
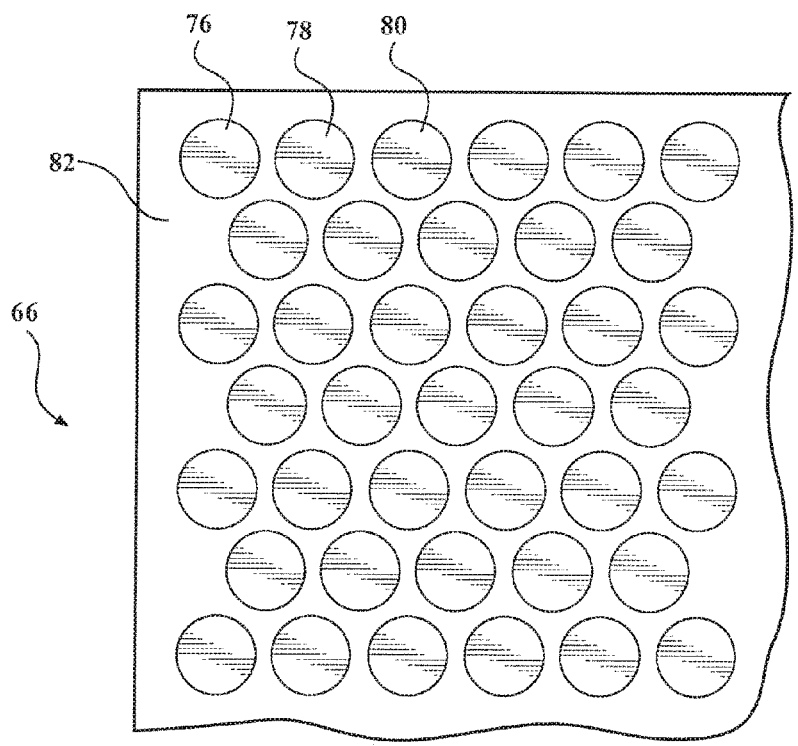

Proceeding to FIGS. 21-22, a pair of sectional partial plan views are respectively shown at 64 and 66, respectively, of additional mat designs, each illustrating pluralities of magnetic portions embedded within a mat (such as further similar to as depicted in FIG. 20 and which is inverted to depict a roof surface conforming underside). FIG. 22 depicts a plurality of hexagonal/polygonal edge portions, each having a thin and wafer like body profile shown at 68, 70, 72 et seq., and which are embedded with or adhered to an underside of a connecting rubberized mat 74, such that the individual magnetic attracting portions are dimensioned to be in contact with the opposing roof surface, the underside adhering portions also being spaced relative to one another in a desired manner with suitable separation distances therebetween.

FIG. 22 further depicts a corresponding plurality of circular edge portions, each having profiles shown at 76, 78, 80, et seq., and which are likewise embedded within (or adhered to an underside surface of) a flexible planar and rubberized mat 82. For purposes of the disclosure, the term polygonal in reference to the individual underside adhering portions is intended to include any closed perimeter shape having any number of sides ranging from a triangle (three sided) to a circle (defined for purposes of this disclosure as a closed perimeter polygon exhibiting an infinite number of sides).

Figure 23:
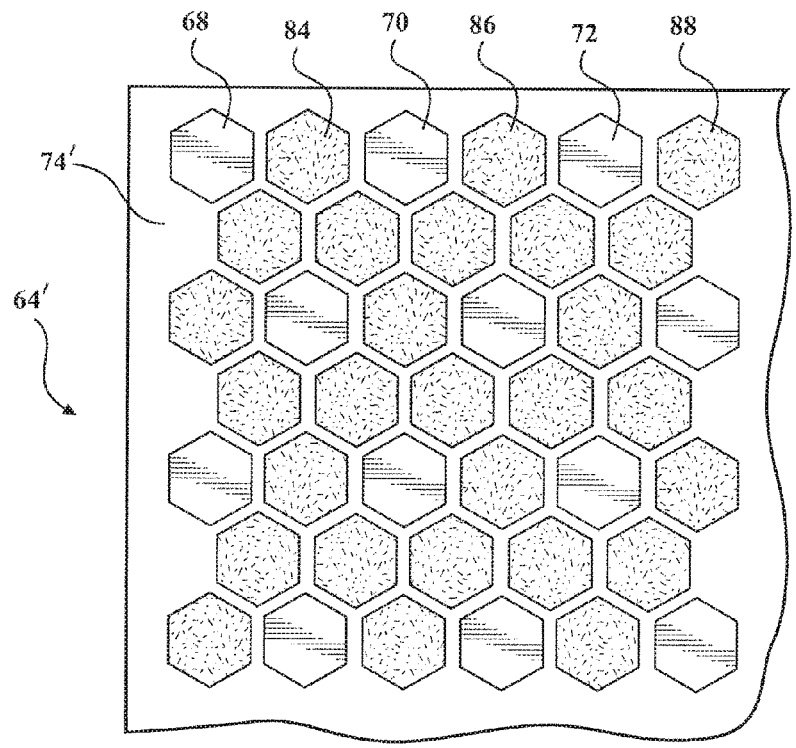
FIG. 23 illustrates a variant of FIG. 21 in which sub-pluralities of both magnetic and conformal adhering underside portions are integrated into an interconnecting rubberized mat matrix.

FIG. 23 illustrates a variant, generally at 64', of FIG. 21 in which sub-pluralities of both magnetic (previously at 68, 70, 72, et seq.) and conformal adhering (see further at 84, 86, 88, et seq.) underside portions are integrated into an interconnecting rubberized mat matrix, see at 74'. The magnetic portions, consistent with that previously described, can include any type of ferritic or other rare earth magnets, with the conformal adhering portions including micro-bunches of the polymeric fibers depicted in FIG. 19 and which are embedded into the individual hexagonal support portions (as further described in succeeding illustrations it is also understood that the conformal adhering portions can also be secured directly to the undersides of the flexible mat in elongated strips or other patterns).

Figure 24:
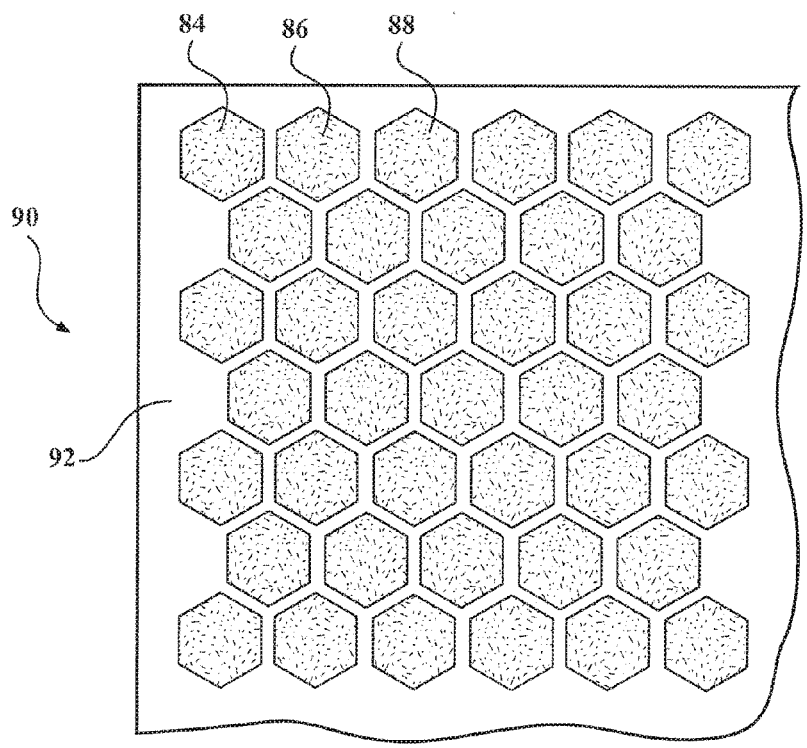
FIG. 24 is a conformal adhering variant of magnetically attracting mat of FIG. 21.

FIG. 24 is a conformal adhering variant of the magnetically attracting mat of FIG. 21, and which is generally depicted at 90, by which all of the hexagonal (or circular or other shaped) portions are replaced by exclusively conformal adhering portions 84, 86, 88, et seq. embedded within a rubberized mat 92. Additional variants contemplate any of different shaping, spacing or distribution of the individual underside supported portions (both magnetic attracting and conformal adhering) and it is further envisioned that additional features such as underside grit surfacing and/or individual skid resistant portions can also be integrated into the mat underside along with any of the alternating variants of FIGS. 21-24.

Proceeding to FIGS. 25-28, a series of side cutaway views are shown of related injection mold processes for creating and manufacturing rubberized mats such as depicted in any of FIGS. 21-24 (as well as for example those to be subsequently depicted in FIG. 29 et seq.). In each example, a pair of upper 96 and lower 98 mold halves are provided which mate in order to define an internal cavity corresponding to a negative of the elongated mat to be produced.

A supply of material, such depicted at 100 and including again any of a rubber material, is injected under pressure through a passageway 102 communicating with the mold cavity interior. It is further understood that, while a single channel 102 is depicted for purposes of ease of illustration, a plurality of concurrently fed channels is also contemplated in order to fill the interior channel in a manner in which the plasticized/rubberized material surrounds an encapsulates a pre-placed plurality of the individual elements which are supported upon the bottom mold half prior to closing and loading of the mold.

The channel shown can also be reconfigured as any number of material communicating channels integrated into the opposing facing surfaces of the mold halves which surround the negative interior shaped cavity, such also including aligning recessed locations which enhance both quick and even filling of the interior with the flowable material. Additional aspects of the interior architecture of the mold halves which define the negative cavity can also include configuring the upwardly facing bottom mold half surface 104 with raised width extending locations, see at 101, 103, 105, et seq., which define an arrangement of underside flex hinges in the completed mat body 74.

As shown in FIG. 25, the plurality of individual elements can again include the magnetic portions 68, 70, 72, et seq., depicted in FIG. 21 and which are seated within mating recessed pockets configured within the upwardly facing surface 104 of the bottom mold half. As also previously referenced, the preplaced portions can also include elongated strips or sheets of material (see in particular FIGS. 29-32) which are supported within the recess configured placement locations defined within the bottom mold half), it being understood that the closed perimeter individual portions of FIGS. 21-25 also reference the elongated strips of FIG. 29 et seq. As further shown, the upper surface of the injection molded mat 74 can again include a diamond back embossment pattern (see again protrusions 58, 60, 62, et seq.).

FIG. 26 is a similar side cutaway view, generally at 106, of an injection mold process for creating a mat having underside embedded conformal adhering portions/strips, see again at 84, 86, 88 consistent with the mat design of FIG. 24. FIG. 27 is a similar side cutaway view, generally at 108, of an injection mold process for creating a mat having underside sub-pluralities of both magnetic and conformal adhering portions/strips consistent with the mat design of FIG. 23. FIG. 28 is an illustration, generally at 110, of a further related variant of an injection molding process for creating a mat which is similar to FIG. 25 and in which the magnetic adhering underside portions 68, 70, 72, et seq. shown are embedded within a modification 74' of the rubberized mat such that their exterior undersides are flush with the underside of the rubberized interconnecting matrix.

Figure 29:
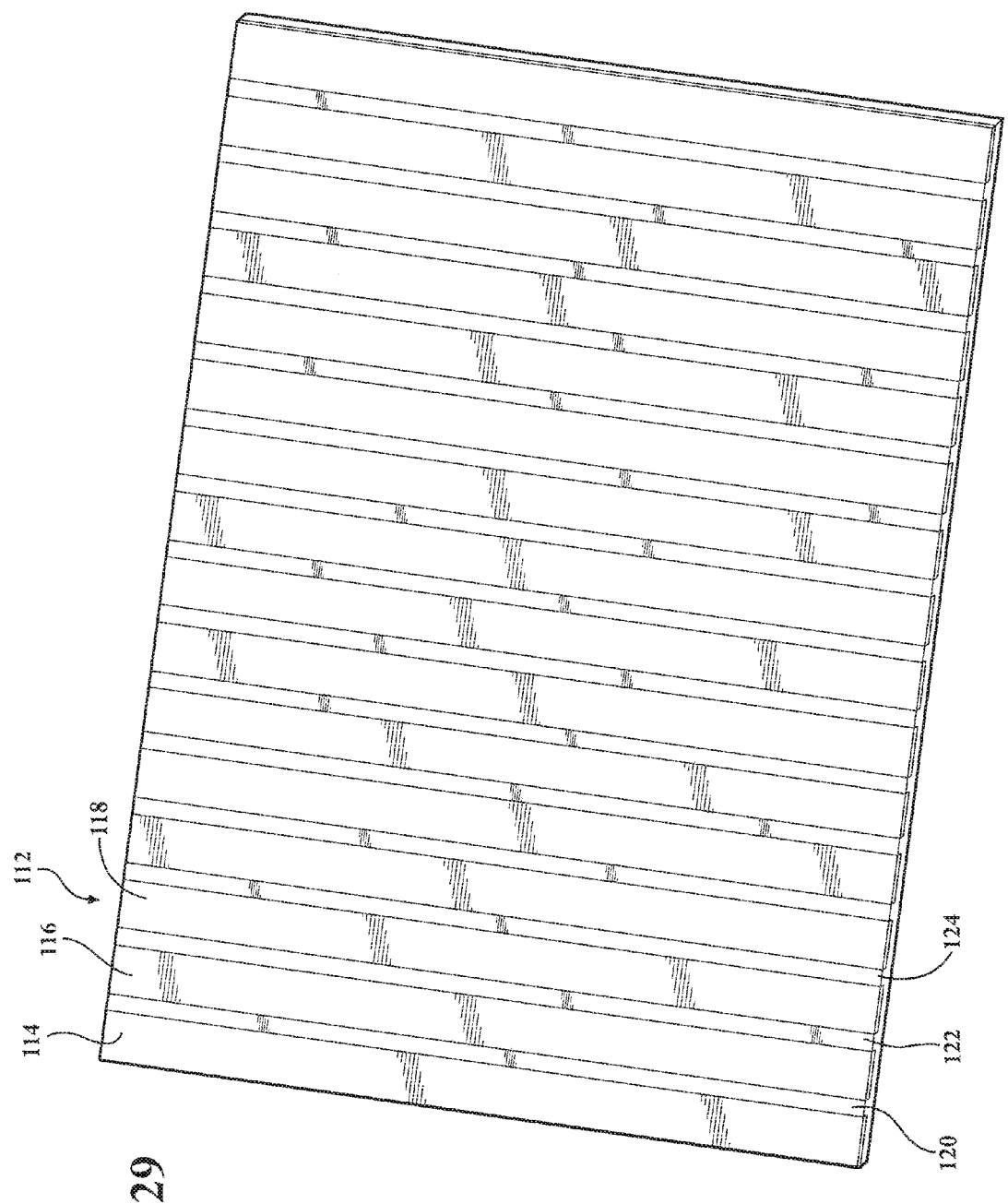
FIG. 29 is an underside perspective of a mat such as also depicted in FIG. 20 and illustrating a plurality of spatially disposed magnetic strips integrated into the mat underside, such as which can also be represented by the injection mold assembly of FIG. 25.

Proceeding to FIG. 29, an underside perspective is generally shown at 112 of a mat such as also depicted in FIG. 20 and illustrating a plurality of spatially disposed magnetic strips, see at 114, 116, 118, et seq., integrated into an underside of a mat, the injection molding of which can also be represented by the injection mold assembly of FIG. 28 (depicting the flush underside profile) and in which the individual polygonal shaped portions are replaced by the elongated strips. A plurality of hinge lines 120, 122, 124, et seq. are depicted and, consistent with previous described embodiments, allow the mat to conform to irregular roof surface profiles in a manner which maximizes the effective surface contact area between the mat underside and the roof exterior.

Figure 30:
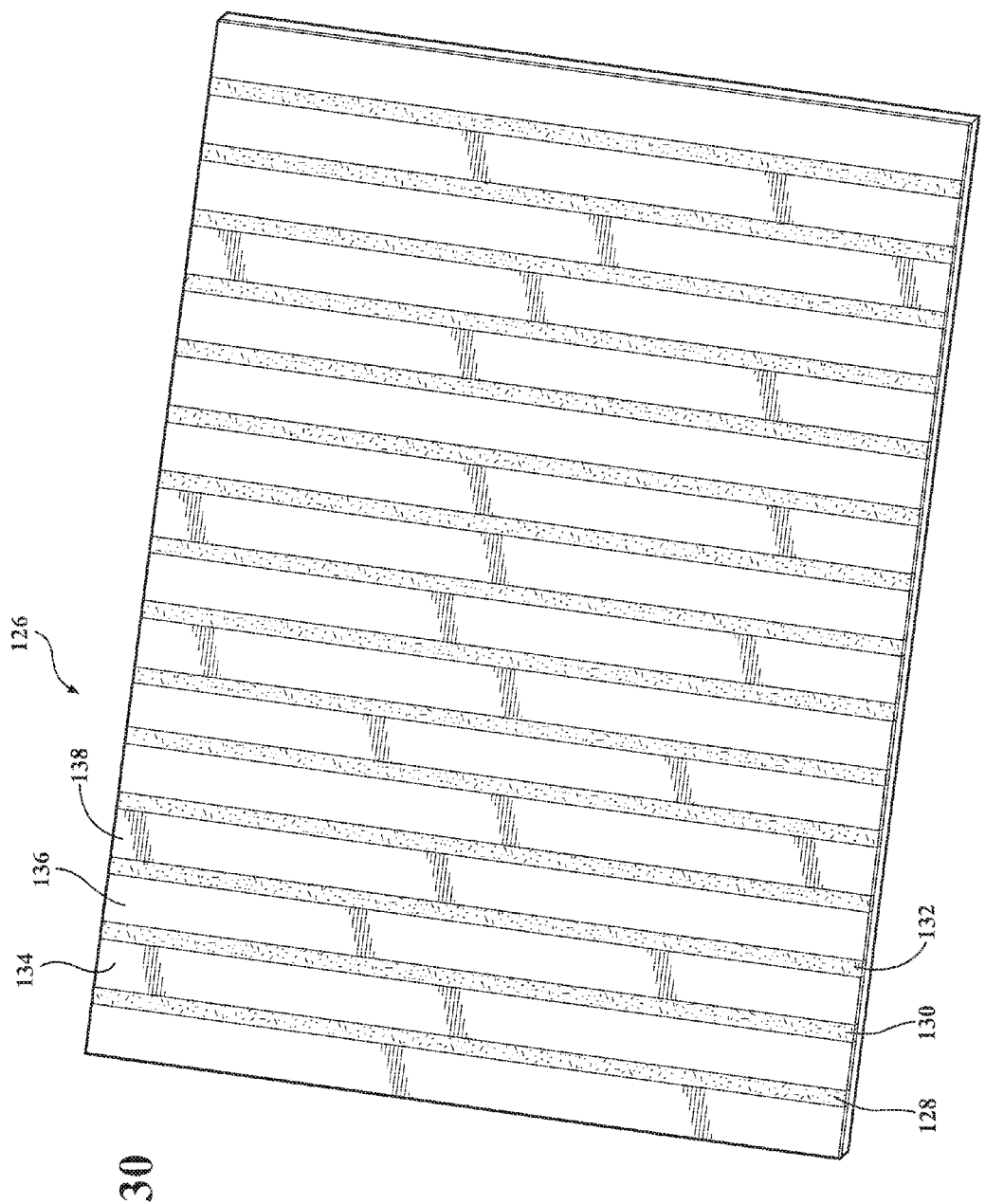
FIG. 30 is a similar underside perspective of a mat such as shown in FIG. 29 and in which the magnetic strips are replaced by conformal adhering strips.

FIG. 30 is a similar underside perspective, at 126, of a mat such as shown in FIG. 29 and in which the magnetic strips are replaced by conformal adhering strips 128, 130, 132, et seq. While the strips are shown in smaller width dimension, it is again understood that their relative dimensions can also vary, such as to equal that depicted in reference to the magnetic strips 114, 116, 118, et seq. in FIG. 29 (see also alternate adhering strip pattern of FIG. 32), and further so that alternating hinge lines can be configured therebetween (corresponding to placement locations 134, 136, 138, et seq.).

Figure 31:
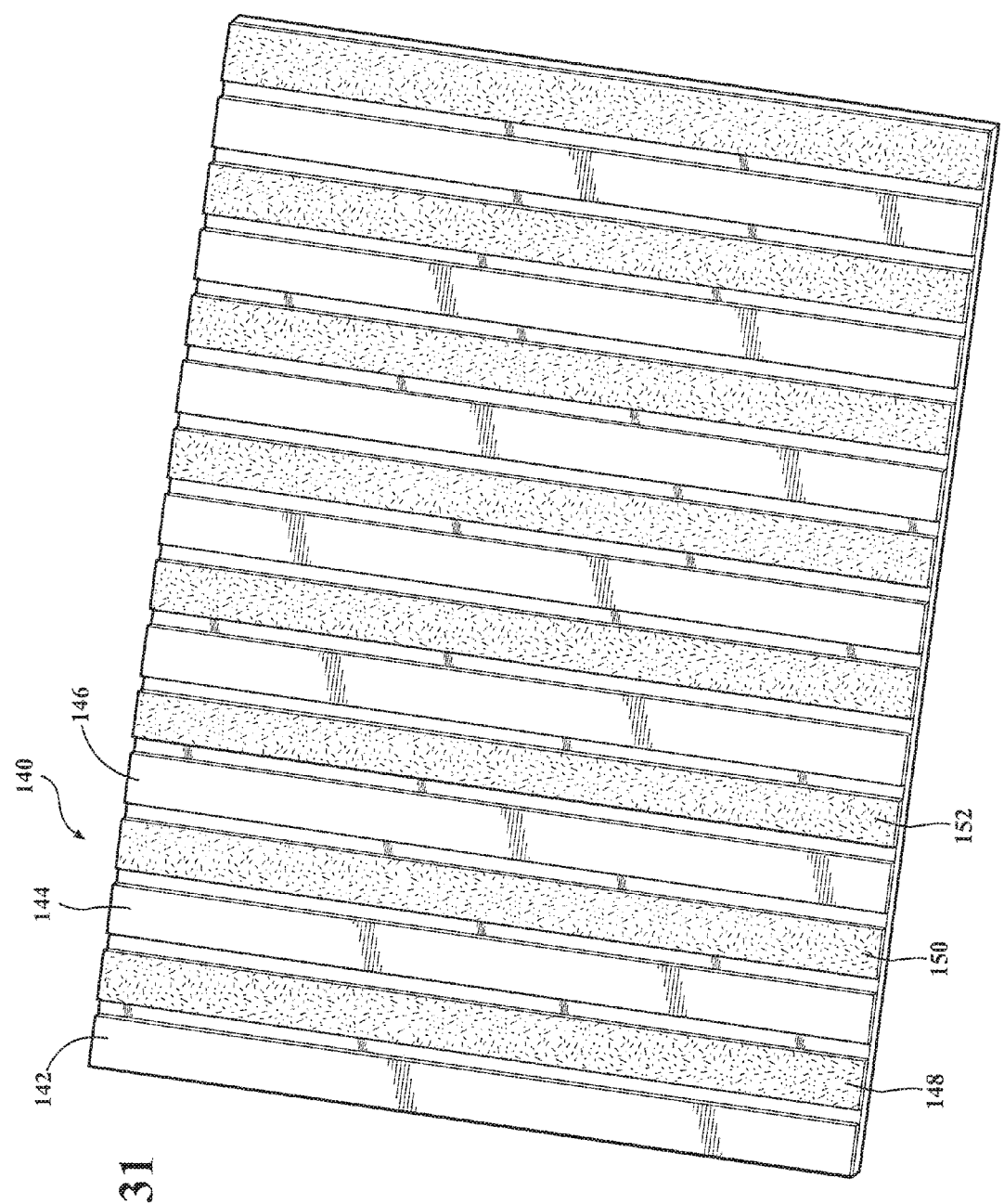
FIG. 31 is a further underside perspective of a mat combining the magnetic and conformal adhering strips in alternating pluralities.
Figure 32:
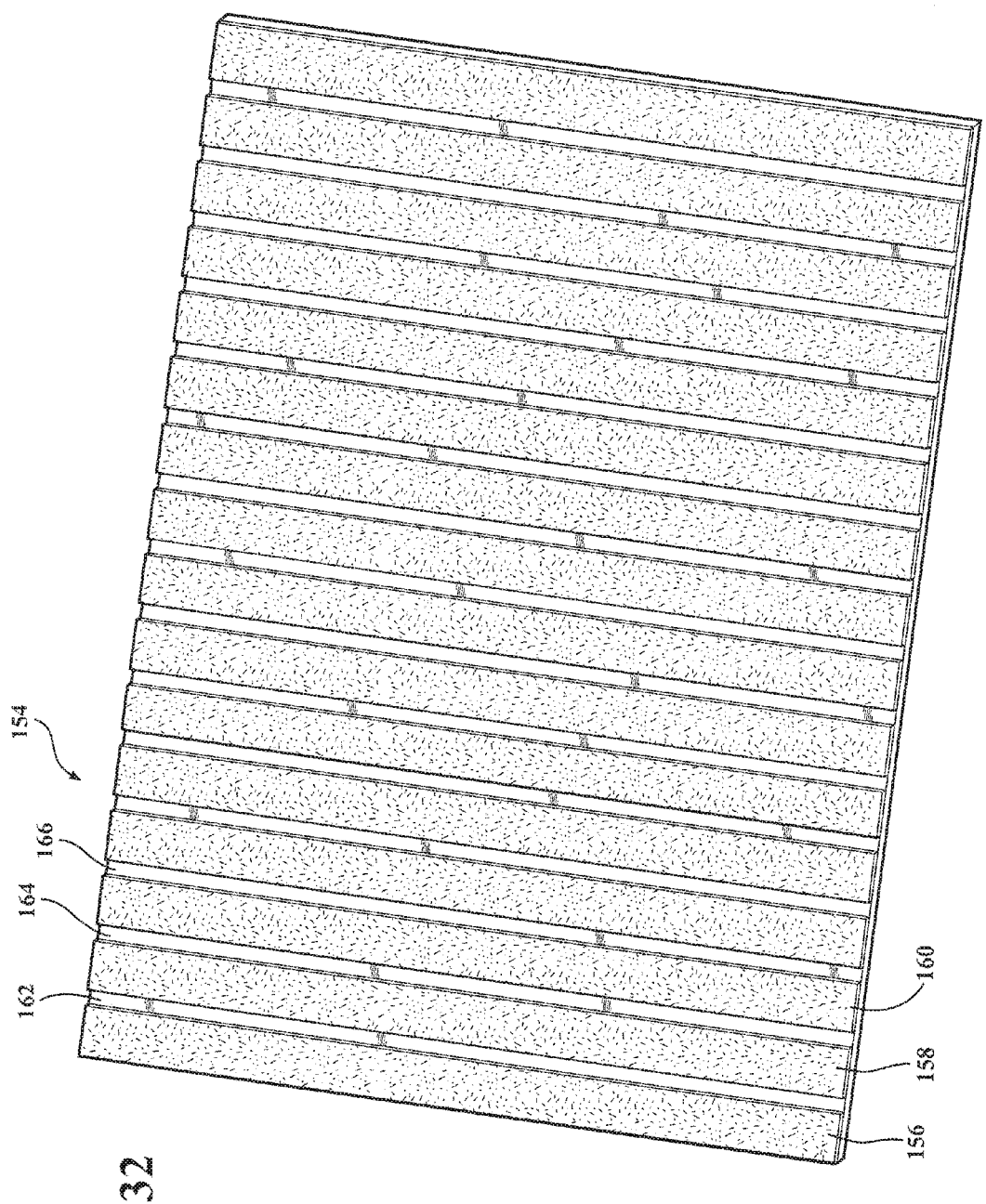
FIG. 32 is a yet further underside perspective of an injection molded mat with underside configured adhering strips which can be further represented by the injection mold assembly of FIG. 28.

FIG. 31 is a further underside perspective, at 140, of a mat combining magnetic (142, 144, 146, et seq.) and conformal adhering (148, 150, 152, et seq.) strips in alternating pluralities, and such as which can be further represented by the injection mold assembly of FIG. 27. FIG. 32 is a yet further underside perspective of an injection molded mat, at 154, with underside configured adhering strips 156, 158, 160, et seq., arranged in a pattern similar to that shown in FIG. 31 in combination with an arrangement of alternating hinge lines 162, 164, 166, et seq.

Figure 33:
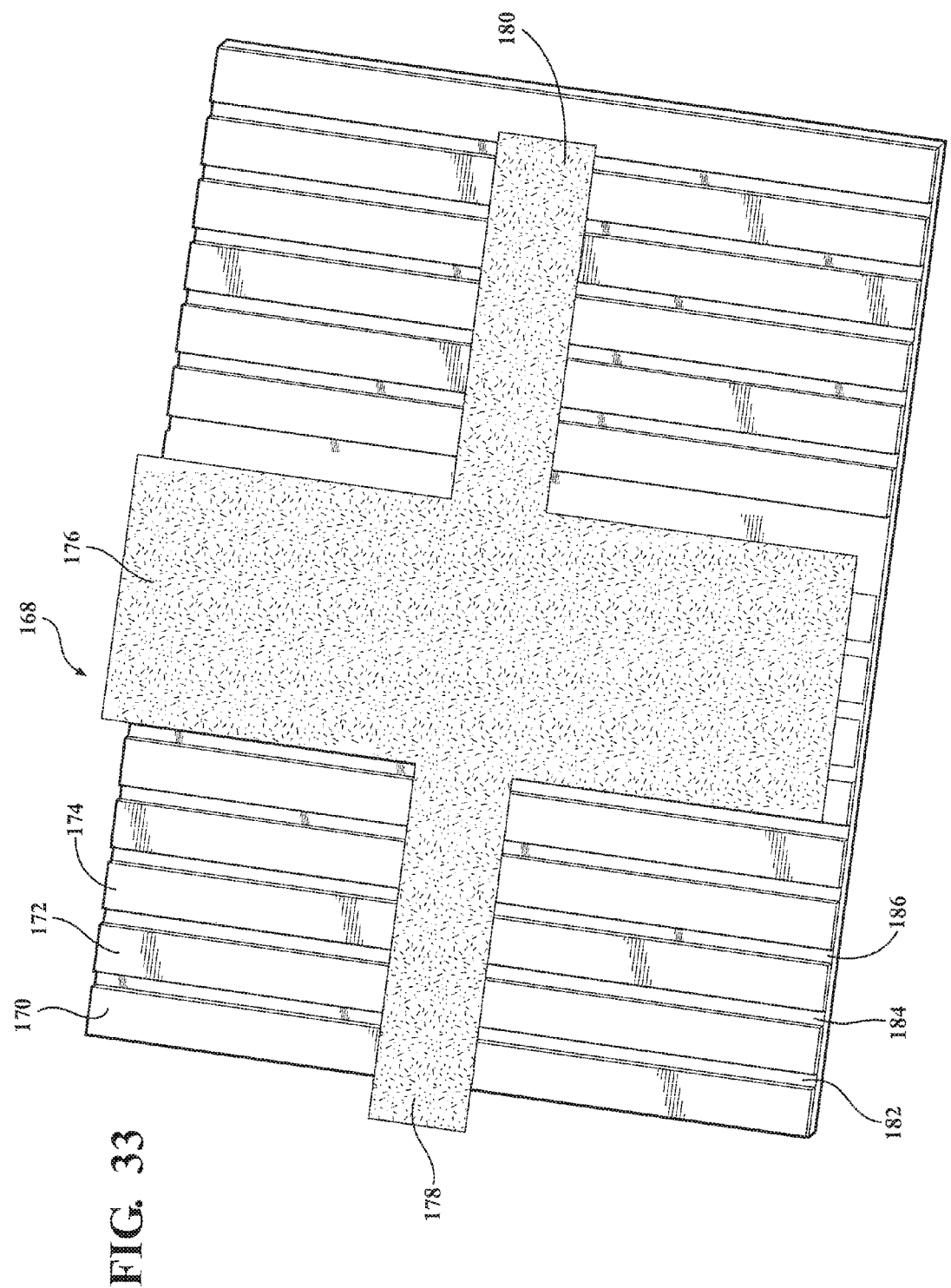
FIG. 33 is an underside perspective of a further example of a combination magnetic strip and conformal adhering anti-skid mat, the design including living hinges extending between the respective strips.
Figure 34:
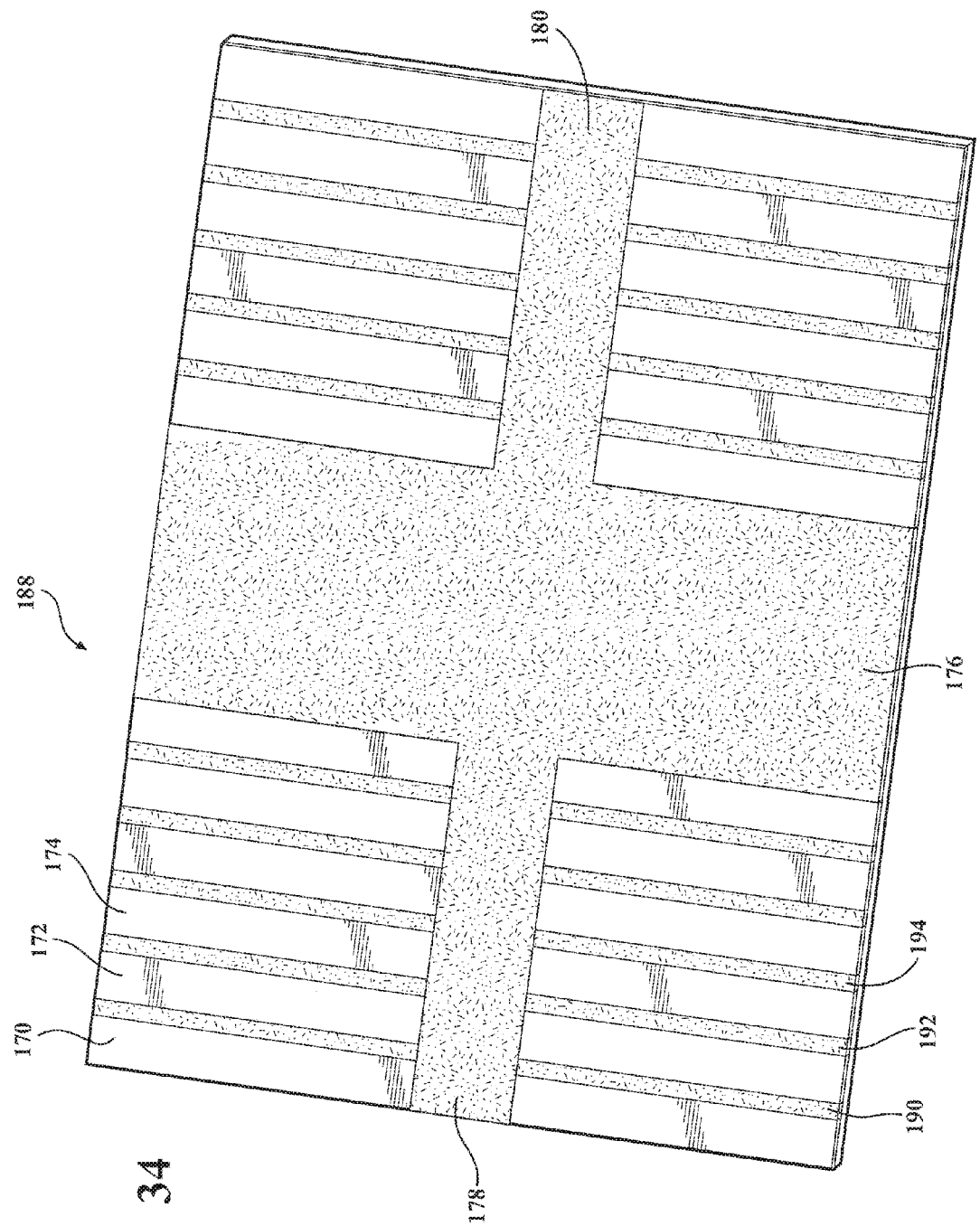
FIG. 34 is a succeeding version to FIG. 33 of a further related version of conformal adhering underside associated with an anti-skid mat.

FIGS. 33-35 present a series of underside perspectives of further variants of mat designs and which provide either or both magnetic attracting and conformal adhering portions arranged in varying patterns. FIG. 33 is an underside perspective, at 168, of a further example of a combination magnetic strips (see quad or corner situated sub-pluralities of strips at 170, 172, in combination with conformal adhering anti-skid portions (see central main micro-fibril adhesion material 176 with communicating and lateral extending wings 178/180). The conformal adhesion materials again include the microfibers depicted in FIG. 19 integrated into the mat design. Living hinges (see at 182, 184, 186, et seq.) are configured between the respective sub-pluralities of magnetic strips and provide some degree of flex or bend to the overall mat.

FIG. 34 is a succeeding version to FIG. 33, see at 188, of a further related version of conformal adhering underside associated with an anti-skid mat including a further possible variant of magnetic strips 170, 172, 174, et seq. in combination with additional hinge-like interposed conformal adhering portions 190, 192, 194, et seq. Finally, FIG. 35 is a yet further underside looking perspective, at 196, of a combination variant of anti-skid mat as generally depicted in FIG. 33 and with the conformal adhering (190, 192, 194, et seq.) and magnetic attracting (170, 172, 174, et seq.) strips in a further combination arrangement with additional integrated hinge lines 198, 200, 202, et seq.

The arrangement of the mats shown in FIGS. 33-35, in combination with those previously depicted, represent additional and non-limiting examples of a variety of different patterns or styles associated with the anti-skid mats and which can include either or both of magnetic attracting and/or conformal adhering microfiber surfaces which can further be provided with designed hinge lines to maximize surface conformation of the mat when placed in plural fashion upon a rooftop location in order to provide a secure walkway surface. In any of the above described and illustrated applications, the anti-skid mats provide a combination of features including high retaining (i.e. frictional anti-skid) force, easy release from roof surface, and reusability.

Having described my invention, other and additional preferred embodiments will become apparent to those skilled in the art to which it pertains and without deviating from the scope of the appended claims.

I claim:

1. A user place-able and repositionable anti-skid mat adapted to being applied atop any sloped or inclined ferritic and non-ferritic roof substrate not limited to a roof, said mat comprising:
    a flexible body having a planar configuration with a length, width and thickness;
    said body having a textured and anti-skid exterior surface along with an adhering underside permitting the body to establish a conformal contact engagement with the roof in order to support a user standing thereupon, the body capable of subsequently being removed and repositioned into a subsequent engagement; and
    said adhering underside having a plurality of individual and spaced apart adhering portions embedded within said body, said adhering underside portions having a plurality of draping adhesions portions, each further including pluralities of microfibers extending from said body, said pluralities of microfibers adapted to contact and conform with the roof surface and establish anti-skid Van de Waal forces.

2. The mat as described in claim 1, further comprising at least one hinge location in said body for establishing the conformal contact engagement with any non-planar roof surface.

3. The mat as described in claim 1, wherein said body further comprising an elongated rectangular shape and being constructed of at least one of a neoprene or synthetic rubberized material.

4. The mat as described in claim 1, wherein said textured and anti skid exterior surface further comprising a diamond deck pattern.

5. The mat as described in claim 1, wherein said spaced apart adhering portions comprise a plurality of elongated strips, at least one hinge line alternating with said strips.

6. The mat as described in claim 1, wherein said spaced apart adhering portions comprise a plurality of polygonal closed perimeter portions.

7. The mat as described in claim 1, wherein said adhering underside portions comprise a plurality of magnetic portions integrated into said flexible body and which are adapted to being attracted to the roof surface.

8. A user place-able and repositionable anti-skid mat adapted to being applied atop any sloped or inclined ferritic and non-ferritic roof substrate not limited to a roof, said mat comprising:
    a flexible body having a planar configuration with a length, width and thickness;
    said body having a textured and anti-skid exterior surface along with an adhering underside permitting the body to establish a conformal contact engagement with the roof in order to support a user standing thereupon, the body capable of subsequently being removed and repositioned into a subsequent engagement; and
    said adhering underside having a plurality of individual and spaced apart adhering portions embedded within said body, said spaced apart adhering portions having a first sub-plurality of magnetic portions and a second plurality of microfiber draping adhesion portions.

* * * * *